(12) United States Patent
Watson

(10) Patent No.: US 11,919,481 B2
(45) Date of Patent: Mar. 5, 2024

(54) RETRACTABLE POWER STEP REMOTE DRIVE

(71) Applicant: Magna Exteriors Inc., Concord (CA)

(72) Inventor: Bradley E. Watson, Barrie (CA)

(73) Assignee: MAGNA EXTERIORS, INC., Concord (CA)

( * ) Notice: Subject to any disclaimer, the term of this patent is extended or adjusted under 35 U.S.C. 154(b) by 217 days.

(21) Appl. No.: 17/426,396

(22) PCT Filed: Apr. 9, 2020

(86) PCT No.: PCT/IB2020/000260
§ 371 (c)(1),
(2) Date: Jul. 28, 2021

(87) PCT Pub. No.: WO2020/208417
PCT Pub. Date: Oct. 15, 2020

(65) Prior Publication Data
US 2022/0097609 A1 Mar. 31, 2022

Related U.S. Application Data

(60) Provisional application No. 62/831,497, filed on Apr. 9, 2019.

(51) Int. Cl.
*B60R 3/02* (2006.01)
(52) U.S. Cl.
CPC ...................................... *B60R 3/02* (2013.01)
(58) Field of Classification Search
CPC ....................................................... B60R 3/02
See application file for complete search history.

(56) References Cited

U.S. PATENT DOCUMENTS

| | | | |
|---|---|---|---|
| 1,456,780 | A | 5/1923 | Kermode |
| 1,515,449 | A | 11/1924 | Vose |
| 1,542,342 | A | 6/1925 | Doctor |
| 1,633,427 | A | 6/1927 | Wiese |
| 1,701,581 | A | 2/1929 | McWhinnie |
| 1,982,748 | A | 12/1934 | Lamonica et al. |
| 2,062,026 | A | 11/1936 | Hassel |
| 2,206,744 | A | 7/1940 | Loecher |

(Continued)

FOREIGN PATENT DOCUMENTS

| | | |
|---|---|---|
| CA | 2362976 A1 | 8/2000 |
| CA | 2475492 A1 | 1/2005 |

(Continued)

OTHER PUBLICATIONS

European Search Report for Application No. 20787568.3, dated Feb. 2, 2022.

(Continued)

*Primary Examiner* — Bryan A Evans
(74) *Attorney, Agent, or Firm* — Warn Partners, P.C.

(57) ABSTRACT

The present invention includes a foldable step assembly for a vehicle. The step assembly includes a linkage arrangement for connection to a vehicle and articulating a step assembly from a deployed position to a stowed position. A drive mechanism is positioned remotely from the step assembly and is operatively in communication with the linkage arrangement for articulating said step assembly between the deployed position to the stowed position.

17 Claims, 21 Drawing Sheets

(56) References Cited

U.S. PATENT DOCUMENTS

| | | |
|---|---|---|
| 2,818,594 A | 1/1958 | Dawkins |
| 3,039,562 A | 6/1962 | Wagner |
| 3,229,993 A | 1/1966 | Riddle |
| 3,404,581 A | 10/1968 | Kraus |
| 3,608,957 A | 9/1971 | Maneck |
| 3,758,134 A | 9/1973 | Stewart |
| 3,762,742 A | 10/1973 | Bucklen |
| 3,955,827 A | 5/1976 | Wonigar |
| 3,957,284 A | 5/1976 | Wright |
| 3,986,724 A | 10/1976 | Rivinius |
| 4,020,920 A | 5/1977 | Abbott |
| 4,110,673 A * | 8/1978 | Nagy .............. H02H 7/0851 280/166 |
| 4,167,272 A | 9/1979 | Wright et al. |
| 4,185,849 A | 1/1980 | Jaeger |
| 4,189,955 A | 2/1980 | Bishop |
| 4,231,583 A | 11/1980 | Leam |
| 4,356,894 A | 11/1982 | Everett |
| 4,909,700 A | 3/1990 | Fontecchio et al. |
| 4,935,638 A | 6/1990 | Straka |
| 4,943,085 A | 7/1990 | Straka |
| 5,193,829 A | 3/1993 | Holloway et al. |
| 5,195,609 A | 3/1993 | Ham et al. |
| 5,228,707 A | 7/1993 | Yoder |
| 5,265,896 A | 11/1993 | Kravitz |
| 5,501,475 A | 3/1996 | Bundy |
| 5,538,269 A | 7/1996 | McDaniel et al. |
| 5,601,300 A | 2/1997 | Fink et al. |
| 5,605,071 A | 2/1997 | Buchanan, Jr. |
| 5,697,626 A | 12/1997 | McDaniel et al. |
| 5,806,869 A | 9/1998 | Richards |
| 5,842,709 A | 12/1998 | Maccabee |
| 5,895,064 A | 4/1999 | Laubach |
| 6,036,208 A | 3/2000 | Frerichs |
| 6,135,472 A | 10/2000 | Wilson et al. |
| 6,149,172 A | 11/2000 | Pascoe et al. |
| 6,325,397 B1 | 12/2001 | Pascoe et al. |
| 6,375,207 B1 | 4/2002 | Dean et al. |
| 6,390,343 B1 | 5/2002 | Jain |
| 6,406,045 B1 | 6/2002 | Farkash |
| 6,435,534 B1 | 8/2002 | Stone |
| 6,533,303 B1 | 3/2003 | Watson |
| 6,581,946 B2 | 6/2003 | Lund et al. |
| 6,641,158 B2 | 11/2003 | Leitner |
| 6,676,223 B2 | 1/2004 | Kolpasky |
| 6,709,137 B1 | 3/2004 | Glovak et al. |
| 6,726,230 B2 | 4/2004 | Weir |
| 6,769,527 B1 | 8/2004 | Paris |
| 6,869,092 B1 | 3/2005 | Henn |
| 6,880,843 B1 | 4/2005 | Greer, Jr. |
| 6,929,163 B1 | 8/2005 | Pedrini et al. |
| 6,938,909 B2 | 9/2005 | Leitner |
| 6,942,233 B2 | 9/2005 | Leitner et al. |
| 6,955,370 B2 * | 10/2005 | Fabiano .............. B60R 3/002 280/166 |
| 6,959,937 B2 | 11/2005 | Schneider et al. |
| 6,971,657 B2 | 12/2005 | King et al. |
| 7,007,961 B2 | 3/2006 | Leitner et al. |
| 7,017,927 B2 | 3/2006 | Henderson et al. |
| 7,055,839 B2 | 6/2006 | Leitner |
| 7,070,194 B2 | 7/2006 | Garland et al. |
| 7,086,656 B2 | 8/2006 | Kolpasky et al. |
| 7,118,120 B2 | 10/2006 | Lee et al. |
| 7,163,221 B2 | 1/2007 | Leitner |
| 7,264,290 B2 | 9/2007 | Tamaya |
| 7,287,771 B2 | 10/2007 | Lee et al. |
| 7,318,596 B2 | 1/2008 | Scheuring, III et al. |
| 7,367,574 B2 | 5/2008 | Leitner |
| 7,377,531 B2 | 5/2008 | Fabiano et al. |
| 7,380,807 B2 | 6/2008 | Leitner |
| 7,398,985 B2 | 7/2008 | Leitner et al. |
| 7,413,204 B2 | 8/2008 | Leitner |
| 7,413,205 B2 | 8/2008 | Watson |
| 7,444,210 B2 | 10/2008 | Breed et al. |
| 7,469,916 B2 | 12/2008 | Watson |
| 7,513,520 B2 | 4/2009 | Okuyama |
| 7,513,565 B2 | 4/2009 | Watson |
| 7,584,975 B2 | 9/2009 | Leitner |
| 7,607,674 B2 | 10/2009 | Watson |
| 7,637,519 B2 | 12/2009 | Leitner et al. |
| 7,692,542 B2 | 4/2010 | Outzs |
| 7,823,896 B2 | 11/2010 | VanBelle et al. |
| 7,976,042 B2 | 7/2011 | Watson et al. |
| 8,136,826 B2 | 3/2012 | Watson |
| 8,157,277 B2 | 4/2012 | Leitner et al. |
| 8,235,432 B2 | 8/2012 | Ryan et al. |
| 8,240,222 B2 | 8/2012 | Yoshioka et al. |
| 8,262,113 B1 | 9/2012 | Chafey et al. |
| 8,297,635 B2 | 10/2012 | Agoncillo et al. |
| 8,342,551 B2 | 1/2013 | Watson |
| 8,602,431 B1 | 12/2013 | May |
| 8,662,512 B2 | 3/2014 | May |
| 8,668,217 B2 | 3/2014 | Ziaylek |
| 8,714,575 B2 | 5/2014 | Watson |
| 8,739,342 B1 | 6/2014 | Johnson et al. |
| 8,833,781 B2 | 9/2014 | Hayes |
| 8,833,782 B2 | 9/2014 | Huotari et al. |
| 8,919,497 B2 | 12/2014 | Rund |
| 9,272,667 B2 | 3/2016 | Smith |
| 9,649,983 B2 | 5/2017 | Watson |
| 10,272,842 B2 | 4/2019 | Du et al. |
| 10,286,847 B2 | 5/2019 | Derbis |
| 10,322,677 B1 | 6/2019 | Leitner et al. |
| 10,343,610 B2 | 7/2019 | Long et al. |
| 10,377,313 B1 | 8/2019 | Brunner |
| 10,399,500 B2 | 9/2019 | Hayes |
| 10,538,204 B2 | 1/2020 | Long et al. |
| 10,919,453 B2 | 2/2021 | Watson |
| 11,077,802 B2 | 8/2021 | Long et al. |
| 11,208,045 B2 | 12/2021 | Watson |
| 2003/0094781 A1 | 5/2003 | Jaramillo et al. |
| 2003/0132595 A1 | 7/2003 | Fabiano et al. |
| 2003/0178805 A1 | 9/2003 | Elrod |
| 2003/0184039 A1 | 10/2003 | Schumacher |
| 2003/0222423 A1 | 12/2003 | Weir |
| 2004/0004339 A1 | 1/2004 | Fichter |
| 2004/0070163 A1 | 4/2004 | Schneider et al. |
| 2004/0084868 A1 | 5/2004 | Leitner et al. |
| 2004/0100063 A1 | 5/2004 | Henderson et al. |
| 2004/0173987 A1 | 9/2004 | Chapman et al. |
| 2004/0174043 A1 | 9/2004 | Bradsen et al. |
| 2005/0012295 A1 | 1/2005 | Chevalier et al. |
| 2005/0062252 A1 | 3/2005 | Vincent |
| 2005/0087950 A1 | 4/2005 | Draper et al. |
| 2005/0127635 A1 | 6/2005 | Fichter |
| 2005/0151340 A1 | 7/2005 | Leitner |
| 2005/0179226 A1 | 8/2005 | Kolpasky et al. |
| 2006/0254376 A1 | 11/2006 | Ota et al. |
| 2007/0085376 A1 | 4/2007 | Kuntze et al. |
| 2007/0126201 A1 | 6/2007 | Crandall |
| 2007/0138757 A1 | 6/2007 | Kuntze et al. |
| 2007/0159308 A1 | 7/2007 | Johnston |
| 2007/0194916 A1 | 8/2007 | Hewitt et al. |
| 2007/0267842 A1 | 11/2007 | Seibert et al. |
| 2008/0106058 A1 | 5/2008 | Demick |
| 2008/0271936 A1 | 11/2008 | Kuntze et al. |
| 2011/0226558 A1 | 9/2011 | Fravel et al. |
| 2012/0098231 A1 | 4/2012 | Huotari et al. |
| 2012/0104719 A1 | 5/2012 | Hayes |
| 2015/0094877 A1 | 4/2015 | Tahnoose et al. |
| 2015/0123374 A1 | 5/2015 | Smith |
| 2016/0023609 A1 | 1/2016 | Watson |
| 2016/0339844 A1 | 11/2016 | Pribisic |
| 2017/0200335 A1 | 7/2017 | Da Deppo et al. |
| 2018/0297530 A1 | 10/2018 | Stickles et al. |
| 2020/0339039 A1 | 10/2020 | Watson |
| 2021/0129759 A1 | 5/2021 | Watson |
| 2021/0323480 A1 | 10/2021 | Long et al. |

(56) References Cited

U.S. PATENT DOCUMENTS

2022/0097609 A1    3/2022   Watson
2022/0185190 A1    6/2022   Johnson et al.

FOREIGN PATENT DOCUMENTS

| | | |
|---|---|---|
| CA | 2362976 C | 4/2008 |
| CN | 2295034 Y | 10/1998 |
| CN | 1209691 A | 3/1999 |
| CN | 1652955 A | 8/2005 |
| CN | 102424021 A | 4/2012 |
| CN | 103158623 A | 6/2013 |
| CN | 203601134 U | 5/2014 |
| DE | 1064364 B | 8/1959 |
| EP | 2216202 A1 | 8/2010 |
| FR | 2670445 A1 | 6/1992 |
| JP | 2008222183 A | 9/2008 |
| JP | 2016188031 A | 11/2016 |
| JP | 2016188044 A | 11/2016 |
| WO | 2000050262 A1 | 8/2000 |
| WO | 2019053698 A1 | 3/2019 |
| WO | 2019232531 A3 | 12/2019 |
| WO | 2022084953 A1 | 4/2022 |

OTHER PUBLICATIONS

International Search Report for PCT/IB2018/057194 dated Dec. 13, 2018 (3-pages).
European Search Report for Application No. EP 18 19 4184 dated May 7, 2019 (1-page).
European Extended Search Report for Application No. EP 18 78 5238 dated Mar. 19, 2020 (2-pages).

\* cited by examiner

RETRACTABLE POWER STEP REMOTE DRIVE

FIELD OF THE INVENTION

The present invention relates to a retractable power step remote drive.

BACKGROUND OF THE INVENTION

There exists a packaging problem to include a motor drive arrangement for a powered step due to limited space in the vehicle in typical locations and especially for rear mounted bumper type retractable step devices. The primary objective is to provide an assembly that allows for remotely packaging a drive system in a suitable location in order to mechanically drive the mechanism for a retractable step.

This improvement is useable on existing powered retractable steps having the motor directly mounted to the hinge link mechanism. The advantage of such products are the overall simplicity and lower cost for a drive system. The disadvantage of such devices are the restraints in packaging size envelope due to location and orientation of the motor. This can occur in the longitudinal, cross car and vertical directions on the vehicle due to the orientation of the motor.

SUMMARY OF THE INVENTION

The present invention includes a foldable step assembly for a vehicle. The step assembly includes a linkage arrangement for connection to a vehicle and articulating a step assembly from a deployed position to a stowed position. A drive mechanism is positioned remotely from the step assembly and is operatively in communication with the linkage arrangement for articulating the step assembly between the deployed position to the stowed position.

The present invention provides a remote drive system which allows the motor to be located in a more suitable location in the general mounting area of the step device to utilize available space and attachment provisions in the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
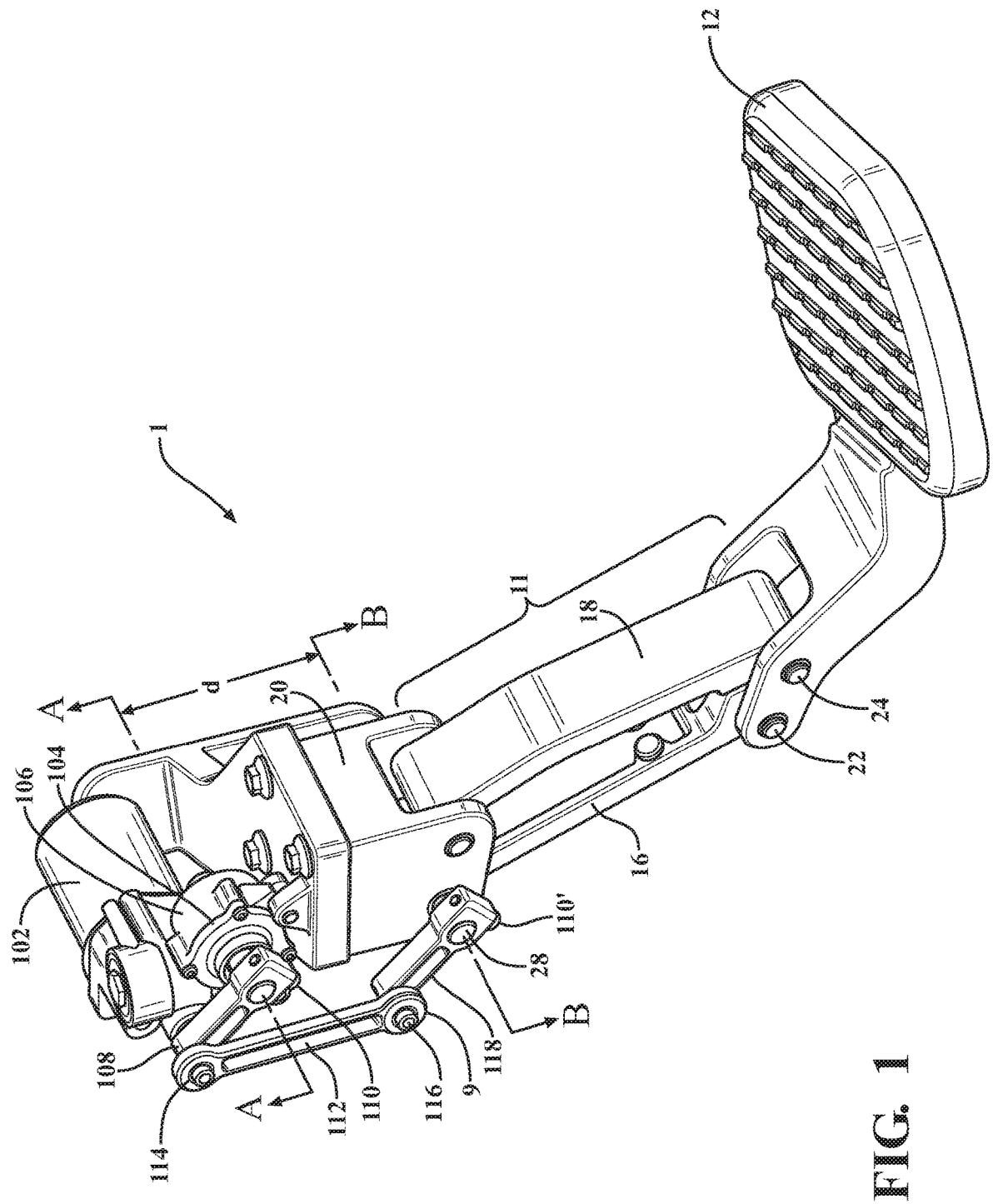
FIG. 1 is a front perspective view of an embodiment of the present invention.

The following description of the preferred embodiment(s) is merely exemplary in nature and is in no way intended to limit the invention, its application, or uses.

The invention includes four different methods to remotely locate a drive motor from a drive shaft of a linkage shown in the attached figures. Referring now to all the figures, there is shown a foldable step assembly 1, 2, 3, 4, 5, 6, 7, 8 each implementing one of four different types of drive mechanisms referred to herein as drive mechanism 100, 200, 300, 400; each corresponding to four different embodiments of the invention used for moving a step 12, 12' between a retracted position and a deployed position for accessing portions of a vehicle. Each foldable step assembly 1, 2, 3, 4, 5, 6, 7, 8 includes a common linkage that connects between the step 12, 12' and the drive mechanism 100, 200, 300, 400. FIGS. 1-17 show the details of each drive mechanism 100, 200, 300, 400, which is used in connection with step 12 on the foldable step assembly 1, 2, 3, 4, while FIGS. 18-21 show drive mechanism 100, 200, 300, 400 being used on step 12' on the foldable step assembly 5, 6, 7, 8. Foldable step assembly 5, 6, 7, 8 differs from the foldable step assembly 1, 2, 3, 4 in that the step 12' is larger and includes a follower link 14 that is shown as not being motorized, however it is within the scope of this invention for the follower link 14 to be driven by a motor either using an independent motor or by using a connection to the drive mechanism 100, 200, 300, 400.

A linkage 11 has some common components extending between the step 12, 12' and drive mechanism 100, 200, 300, 400. The linkage is a four bar linkage that includes a drive arm 16 connected to the step 12, 12' at a pivot connection 22, and a follower arm 18 connected to the step 12, 12' at a pivot connection 24. The drive arm 16 and a follower arm 18 are pivotally connected to a base 20 with the follower arm 18 pivotally connected at a pivot 26 and the drive arm 16 pivotally connected at a drive shaft 28. The base 20 is connectable to a vehicle. The drive shaft 28 receives rotational force from the drive mechanism 100, 200, 300, 400 selected.

One limitation with providing motorized step assemblies on vehicles is that the vehicle packaging constraints limit being able to connect a motor directly to the drive shaft 28. The present invention addresses this issue because each drive mechanism 100, 200, 300, 400 employs a different mechanism to transfer rotational force from a motor to the drive shaft 28, while allowing the motor to be mounted at a location distant from the drive shaft 28. The details of various drive mechanisms 100, 200, 300, 400 that allow the motor to be mounted apart from the drive shaft 28 will now be described.

Figure 2:
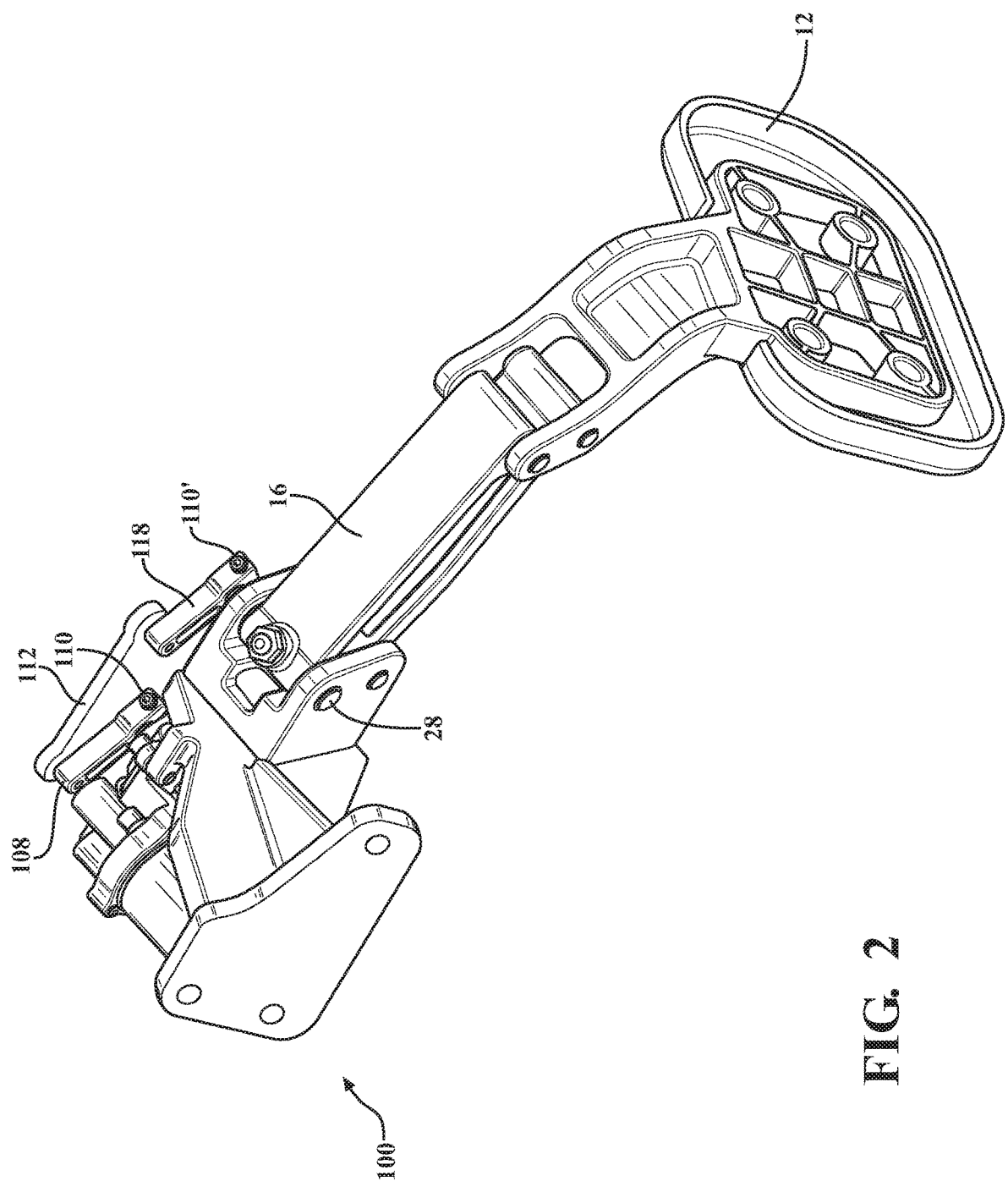
FIG. 2 is a rear perspective view of the embodiment shown in FIG. 1.
Figure 3:
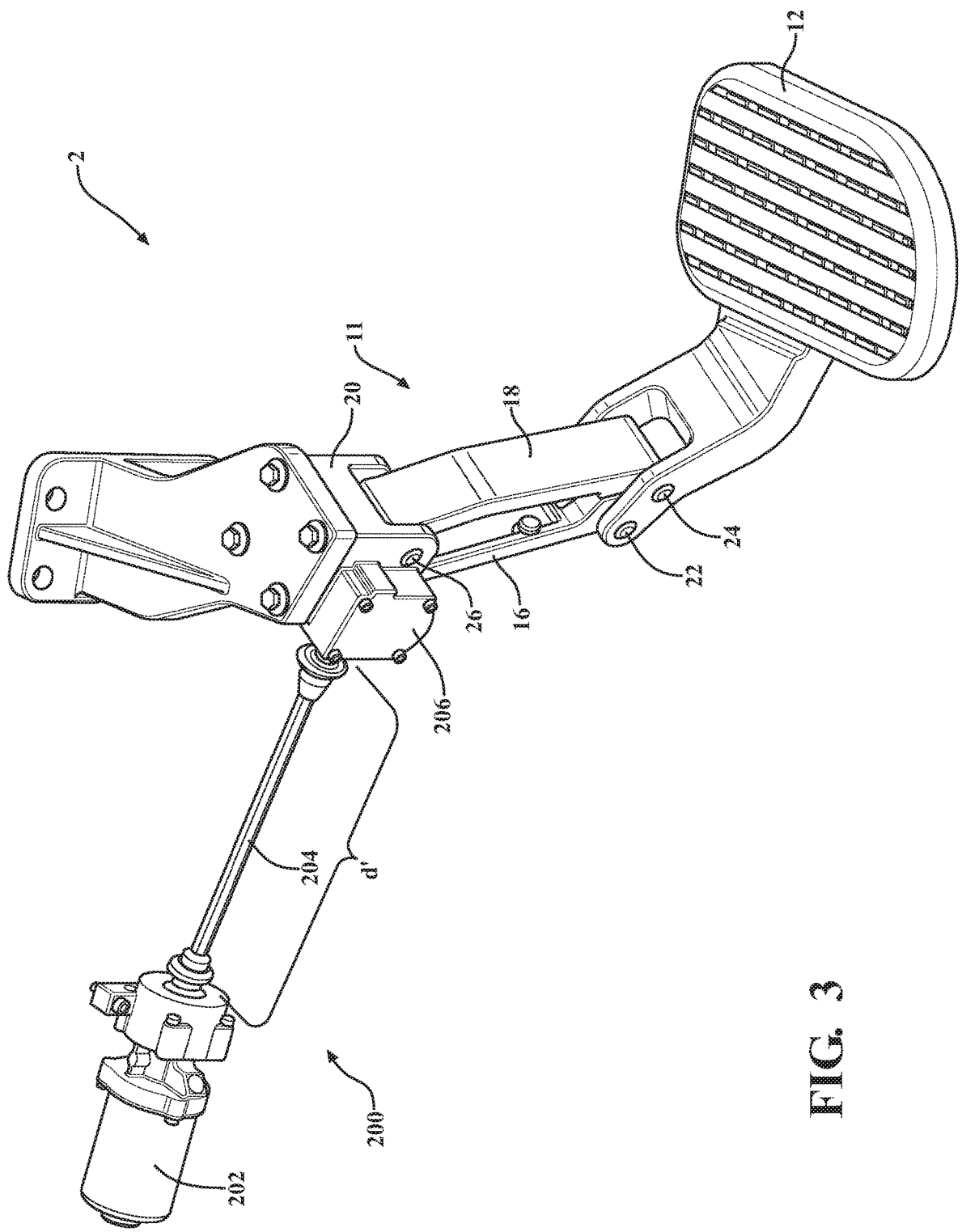
FIG. 3 is a perspective view of an alternate embodiment of the present invention.
Figure 4:
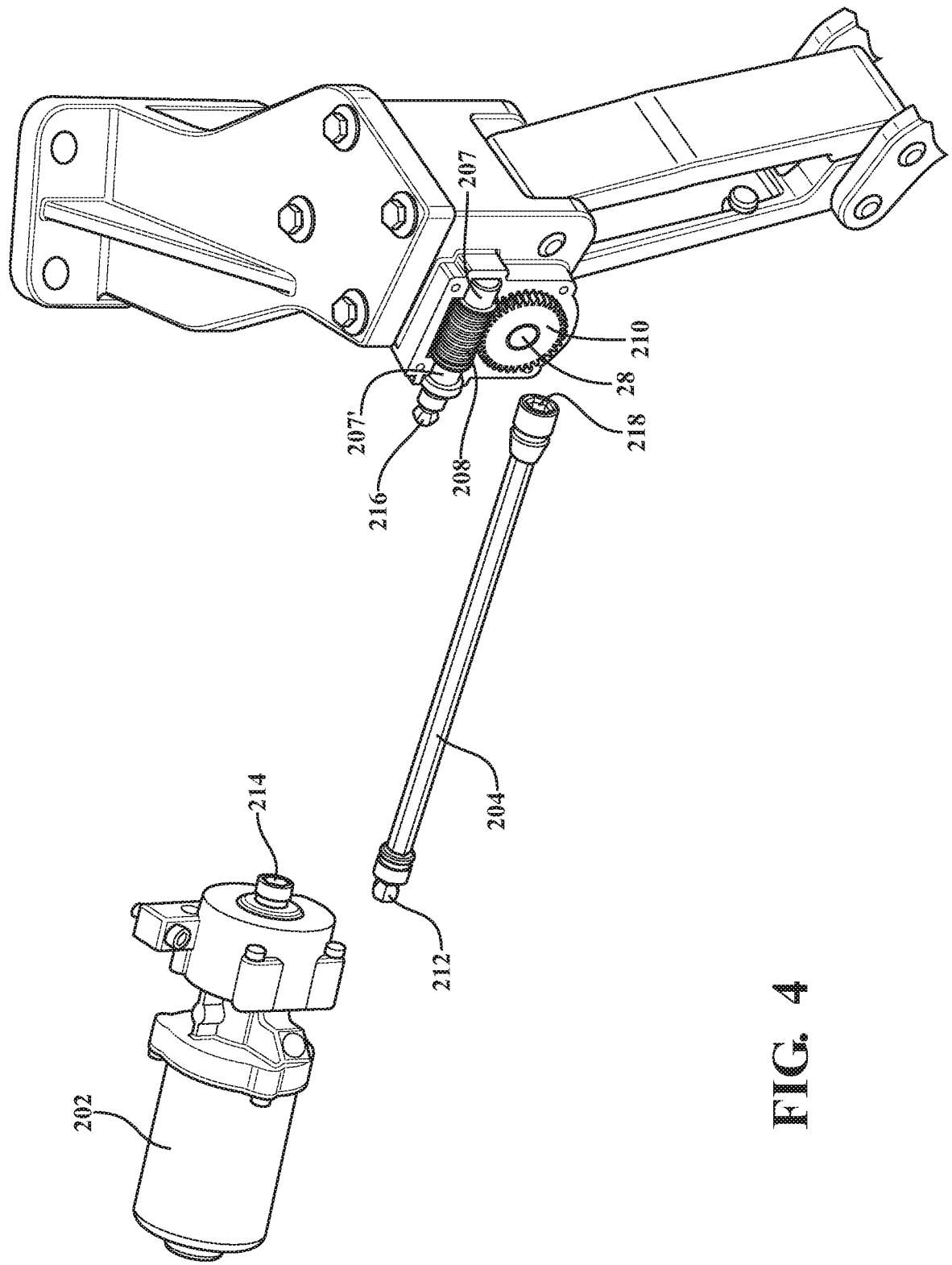
FIG. 4 is a detailed exploded view of the drive mechanism of the embodiment of FIG. 3.
Figure 5:
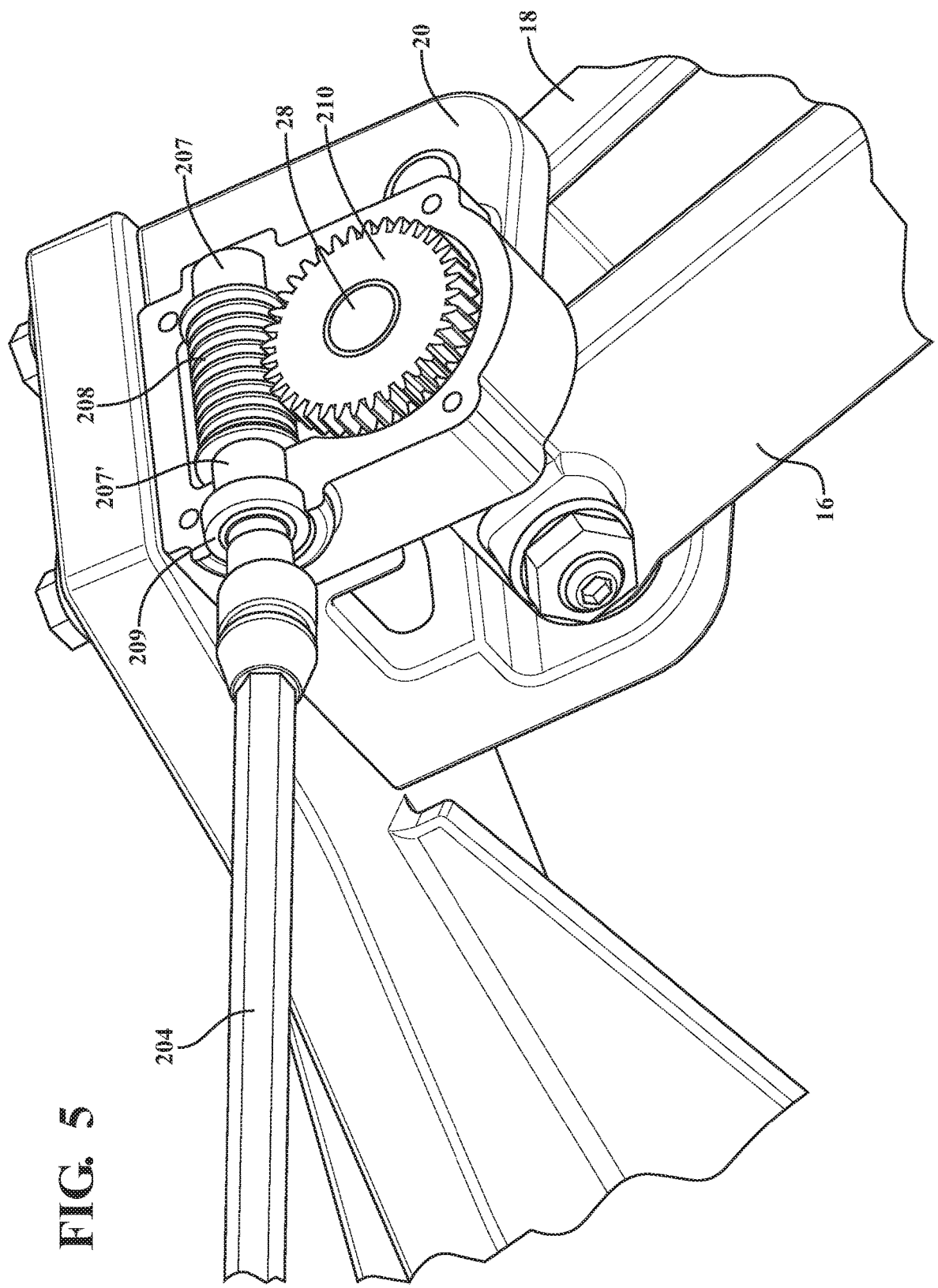
FIG. 5 is a detailed perspective view of the worm gear drive mechanism of the embodiment of FIG. 3.
Figure 6:
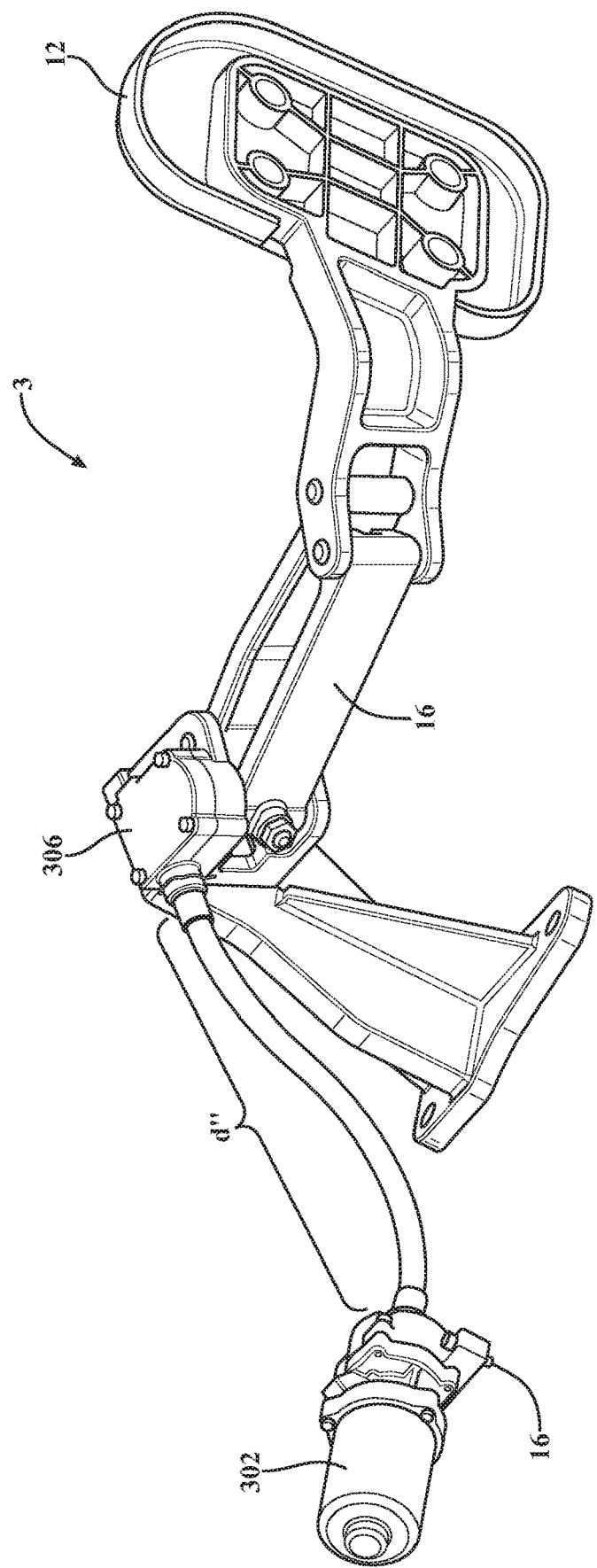
FIG. 6 is a rear perspective view of another alternate embodiment of the present invention.
Figure 7:
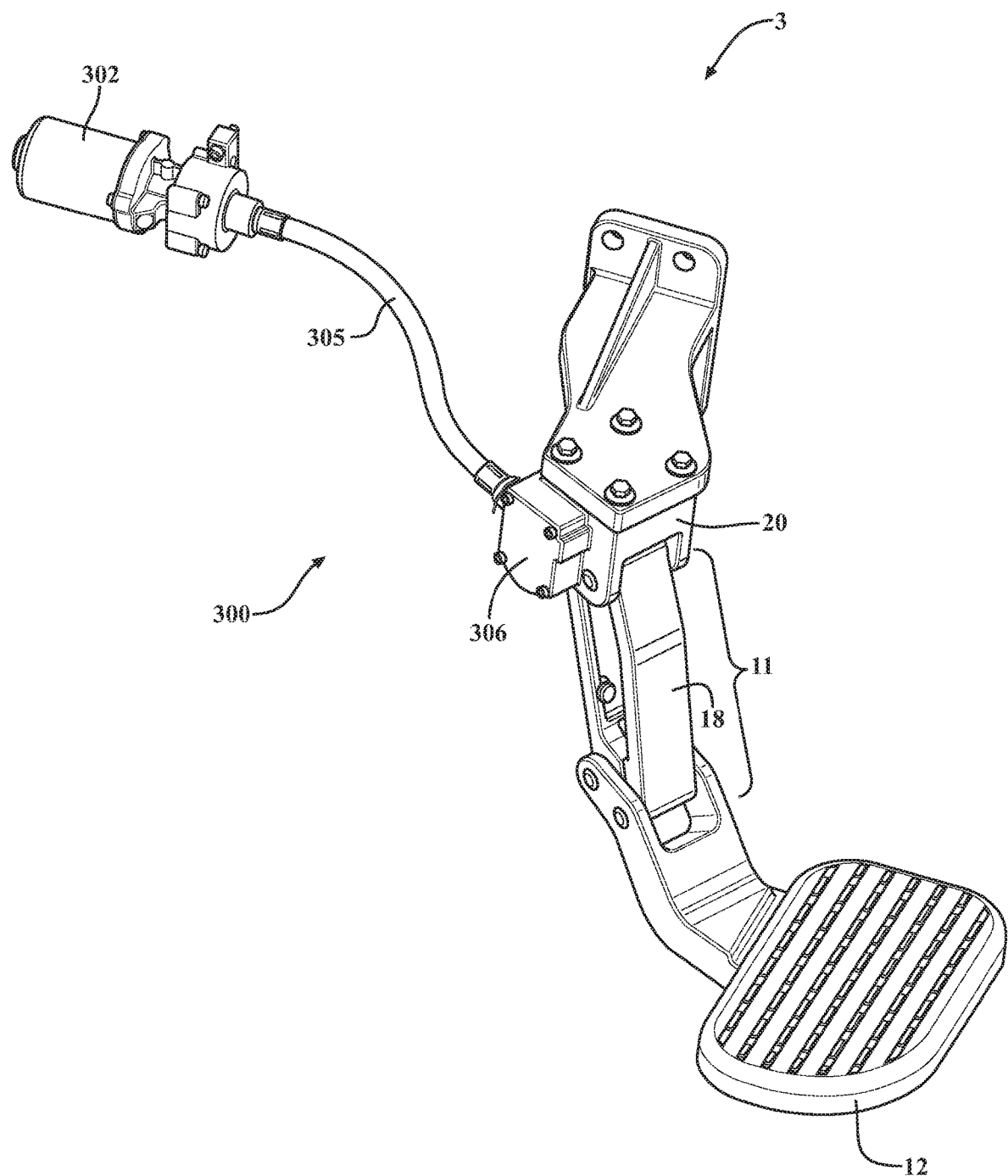
FIG. 7 is a front perspective view of the embodiment of FIG. 6.
Figure 8:
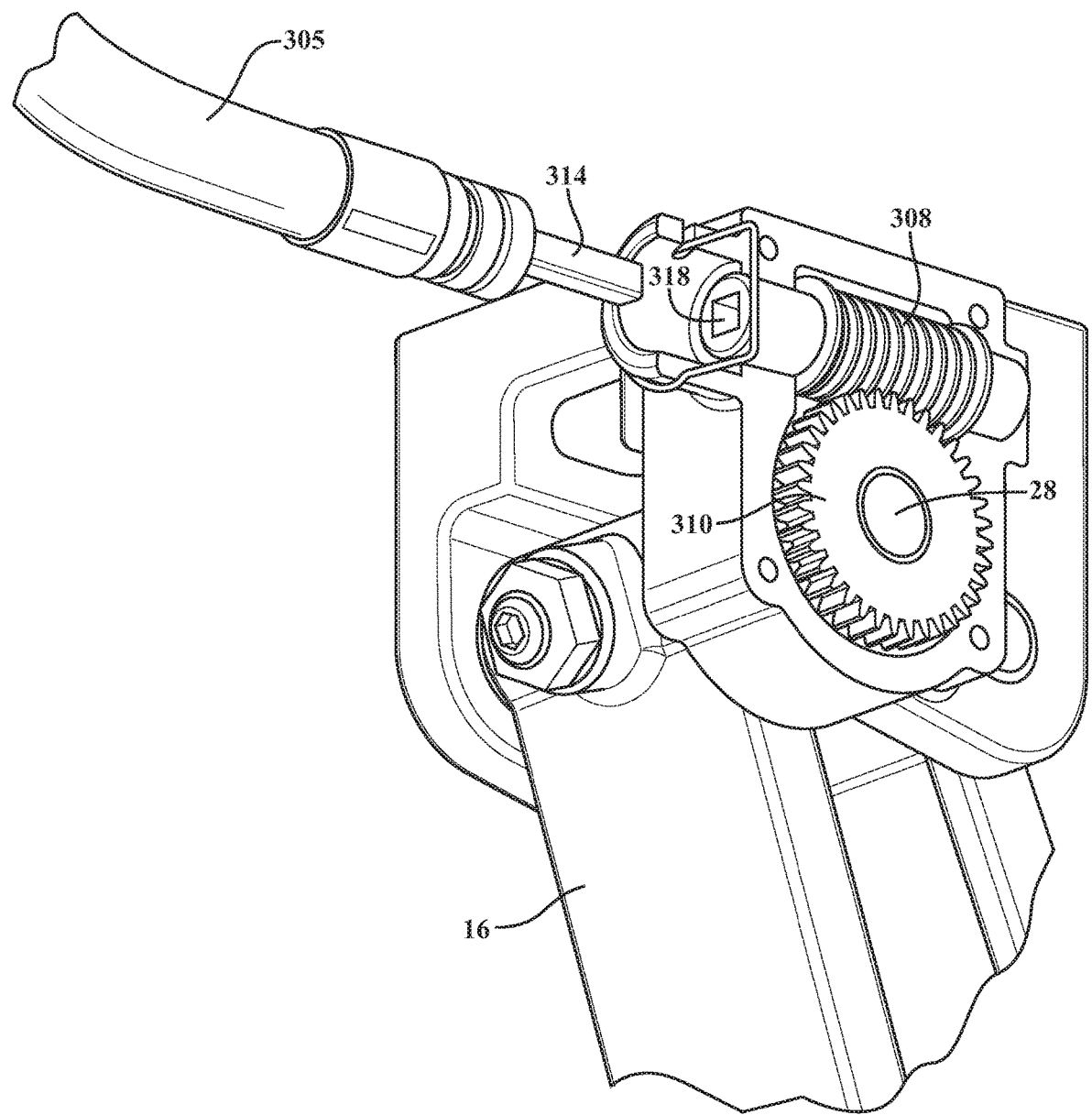
FIG. 8 is a detailed perspective view of the drive mechanism of the embodiment of FIG. 6.
Figure 9:
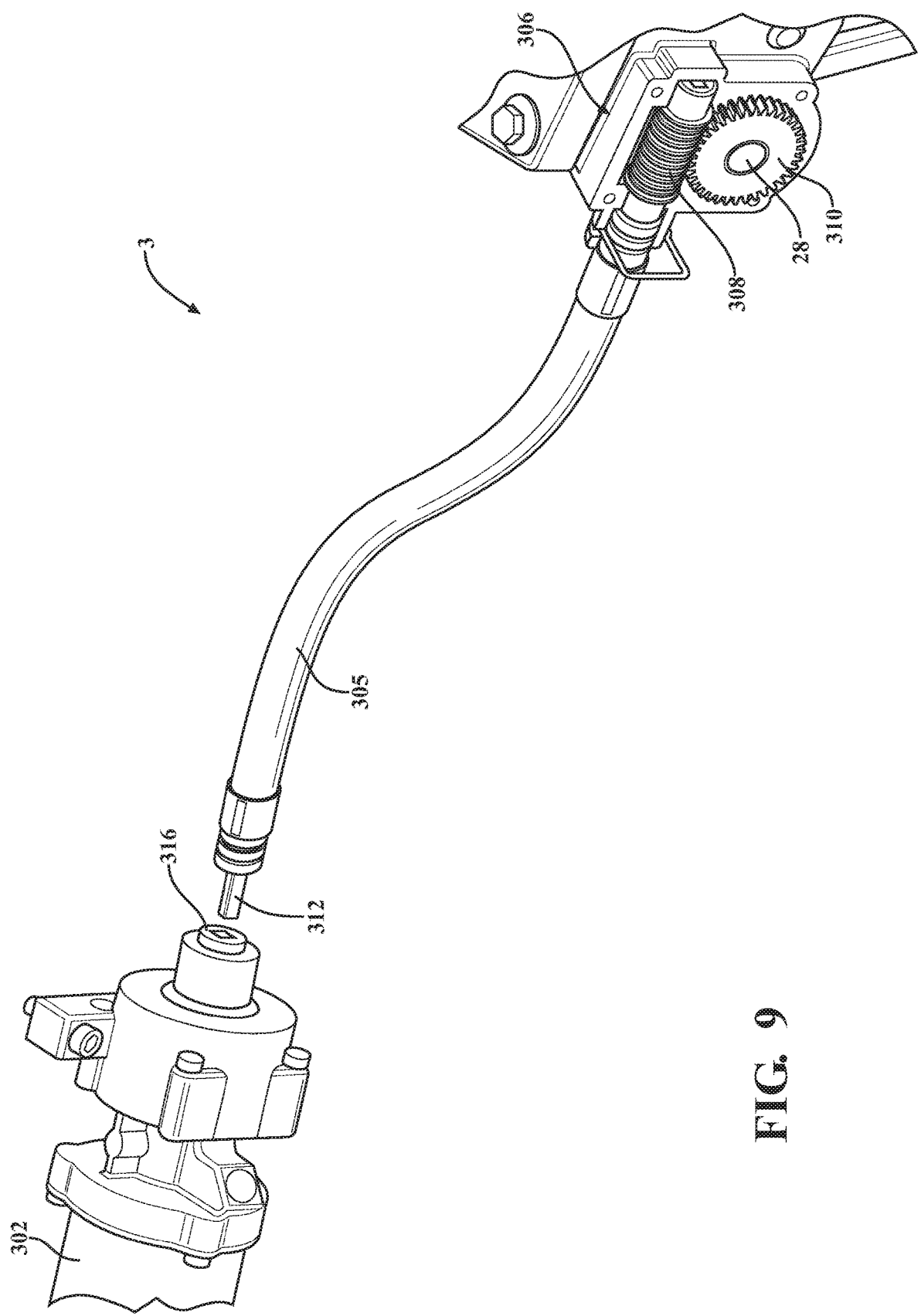
FIG. 9 is a detailed perspective view of the drive mechanism of the embodiment of FIG. 6.
Figure 10:
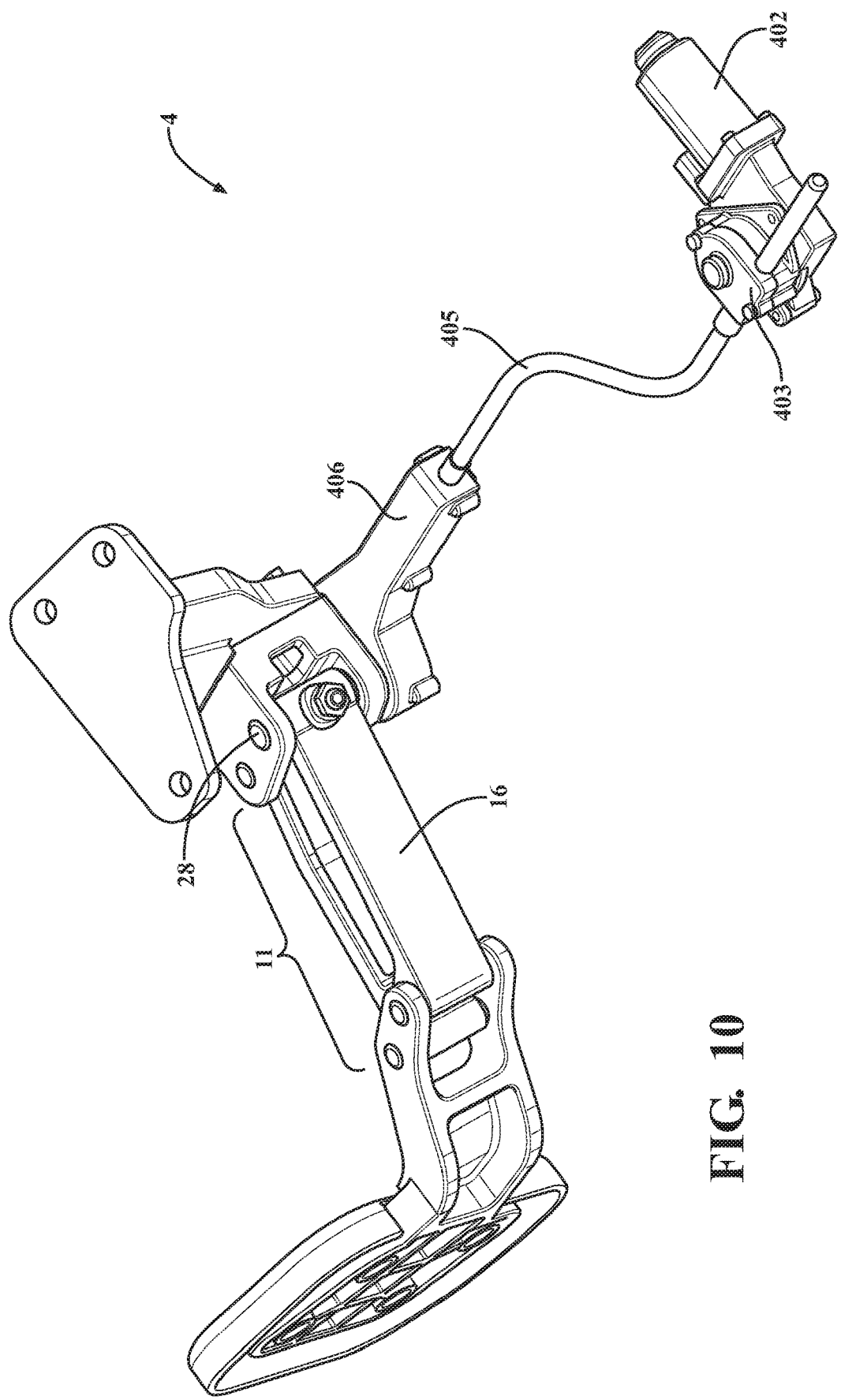
FIG. 10 is a perspective view of a further embodiment of the present invention.
Figure 11:
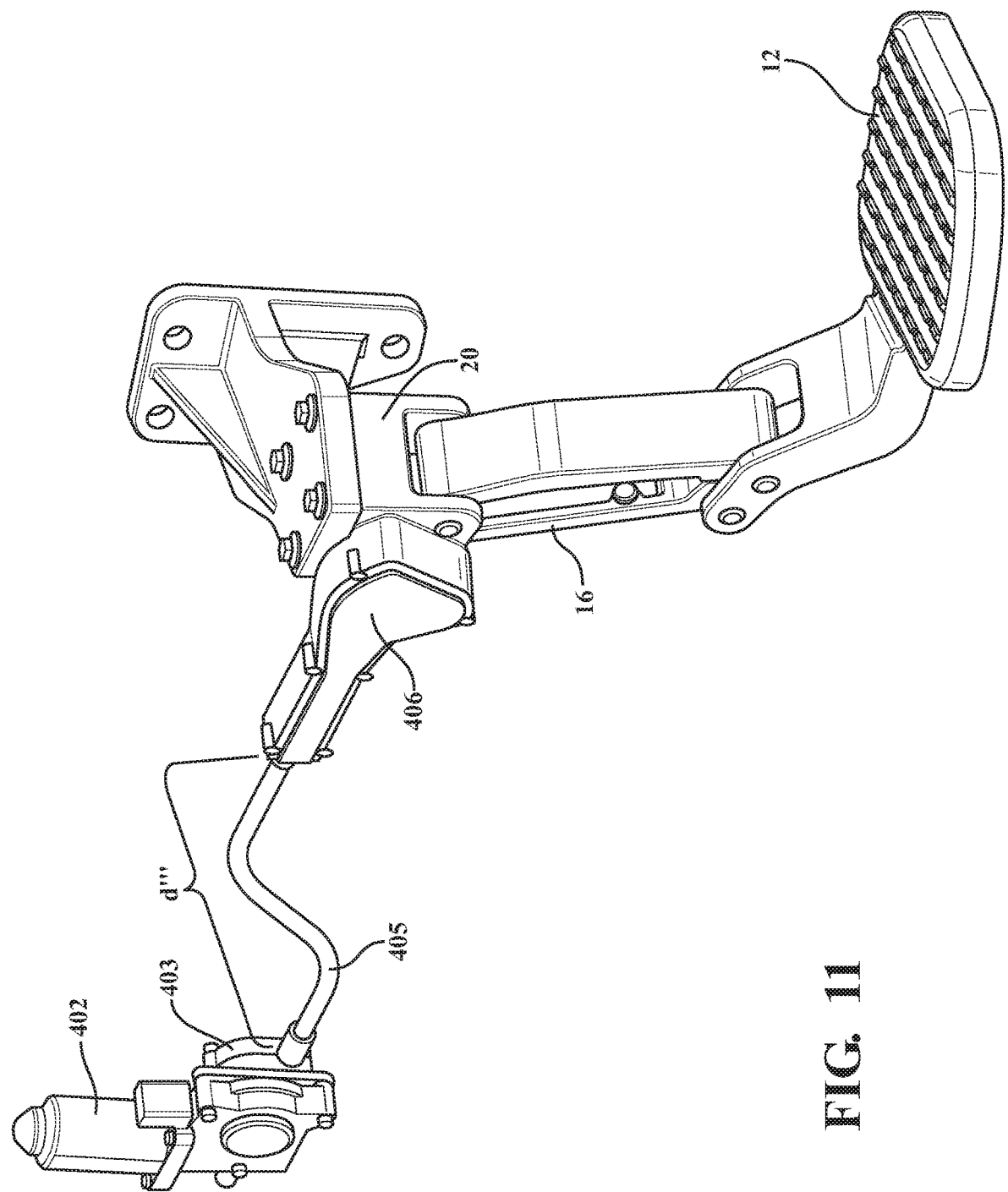
FIG. 11 is a front perspective view of the embodiment of FIG. 10.
Figure 12:
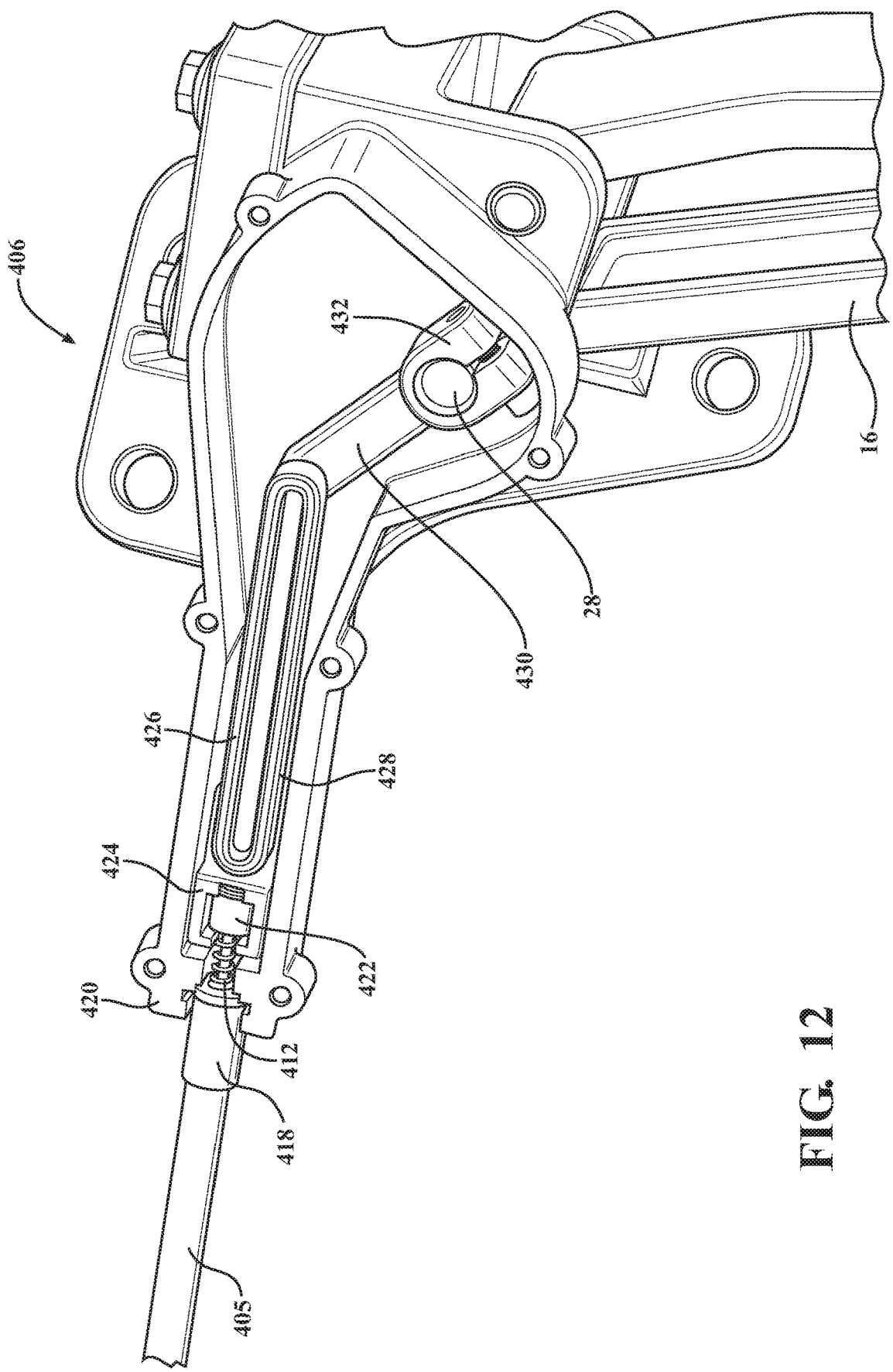
FIG. 12 is a detailed perspective view of the drive mechanism of the embodiment of FIG. 10.
Figure 21:
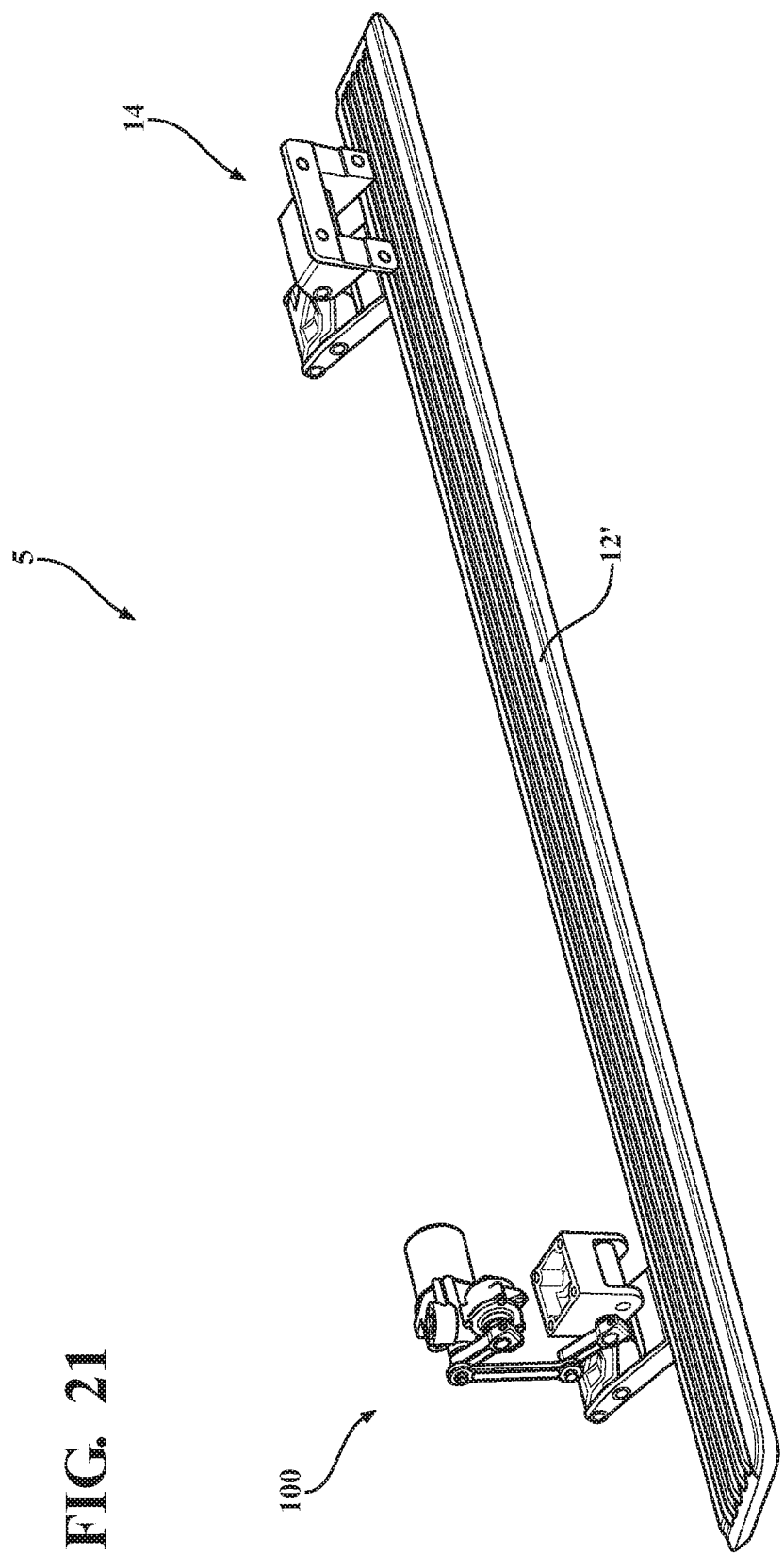
FIG. 21 is a perspective view of the embodiment of the invention shown in FIG. 1 employed on a side step for attachment to the rocker panel of a vehicle.

Referring now to FIGS. 1, 2 and 21 the foldable step assembly 1, 5 with linkage 100 will now be described. The drive mechanism 100 is referred to as a "bell crank assembly." The drive mechanism 100 has a motor 102 having an output shaft 104 that connects to the motor 102 through a transmission 106 that includes a gear train in a housing that is driven by the motor 102. The output shaft is connected at a spatial distance d from the drive shaft 28. It is within the scope of this invention for the motor 102 to directly drive the output shaft 104 depending on the size of the motor and needs of a particular application.

The motor 102 can be any suitable motor capable of providing rotary motion. In the present embodiment of the invention the motor 102 is a direct current motor that is capable of rotating bi-directionally. The output shaft 104 has an axis AA that is typically parallel with an axis B-B of the drive shaft 28, this allows the motor 102 to be located distant from the drive shaft 28, thereby freeing up space adjacent the drive shaft 28, which could limit possible locations that the step assembly 1, 5 could be mounted. The distance between axis A-A and axis B-B is the spatial distance d.

The drive mechanism 1, 5 includes a first arm 108 connected to the output shaft 28 using a clamp 110 connection. The first arm 108 is connected to a second arm 112 at pivot 114. The second arm 112 at a second end has a pivot 116 that connects to a driven arm 118. The driven arm 118 has a clamp 110' that connects to the drive shaft 28, whereby allowing rotational force from the motor 102 to be transferred from the output shaft 104, through the first arm 108, second arm 112 and driven arm 118, thereby rotating the drive shaft 28, which then causes the link 11 to move between the extended position or retracted position depending on the direction that the motor 102 turns the transmission 106 and output shaft 104. As shown in FIG. 21 foldable step assembly 5 the drive mechanism 100 is also useable on a step 12' which is a full length power running board. It is also within the scope of this invention for the actuator 100 to be used on a side box step, or a rear bumper type step similar to the foldable step assembly 1 shown in FIGS. 1 and 2.

Referring now to FIGS. 3-5 and 18 the foldable step assembly 2, 6 with linkage 200 will now be described. The drive mechanism 200 is also referred to as a "remote motor torque transfer shaft type". This includes a motor 202 connected to a torque transfer shaft 204 that connects to a transmission 206 connected to the base 20 that ultimately connects to the drive shaft 28 of the linkage 11. The transmission 206 has a worm gear 208 in the transmission 206 and rotatably positioned on a bearing 207, 207'. The worm gear 208 is in mesh engagement with a gear 210 rotatably connected to drive shaft 28 of the linkage 11. The torque transfer shaft 204 of the drive mechanism 200 includes a spherical hex type universal joint design that has a first male connector 212 that is received by a first female connector 214 which is part of or connected to an output shaft of the motor 202. At the opposite end of the torque transfer shaft 204 is a second male connector 216 connected to the worm 208 that is received by a second female connector 218 formed on the second end of the torque transfer shaft 204. The second male connector 218 extends through the housing of the transmission 206 and has a seal 209 that circumscribes the where the second male connector 216 extends outside of the housing of the transmission 206.

When the motor 202 rotates the first female connector 214 is driven by the motor 202, which then rotates the torque transfer shaft 204 through the connection of the first female connector 213 with the first male connector 212. The rotation of the torque transfer shaft 204 rotates the second female connector 218, which connects to the second male connector 216, thereby causing rotation of the worm gear 208. The rotation of the worm gear 208 causes the gear 210 to rotate because the mesh engagement of the threads of the worm gear 208 with the teeth of the gear 210. The gear 210 is fixed to the drive shaft 28, thereby causing the drive shaft 28 to rotate with the gear 210. When the drive shaft rotates 28 the linkage 11 and the step 12, 12' will move between the retracted position or the extended position depending on the direction that the motor 202 rotates.

Figure 18:
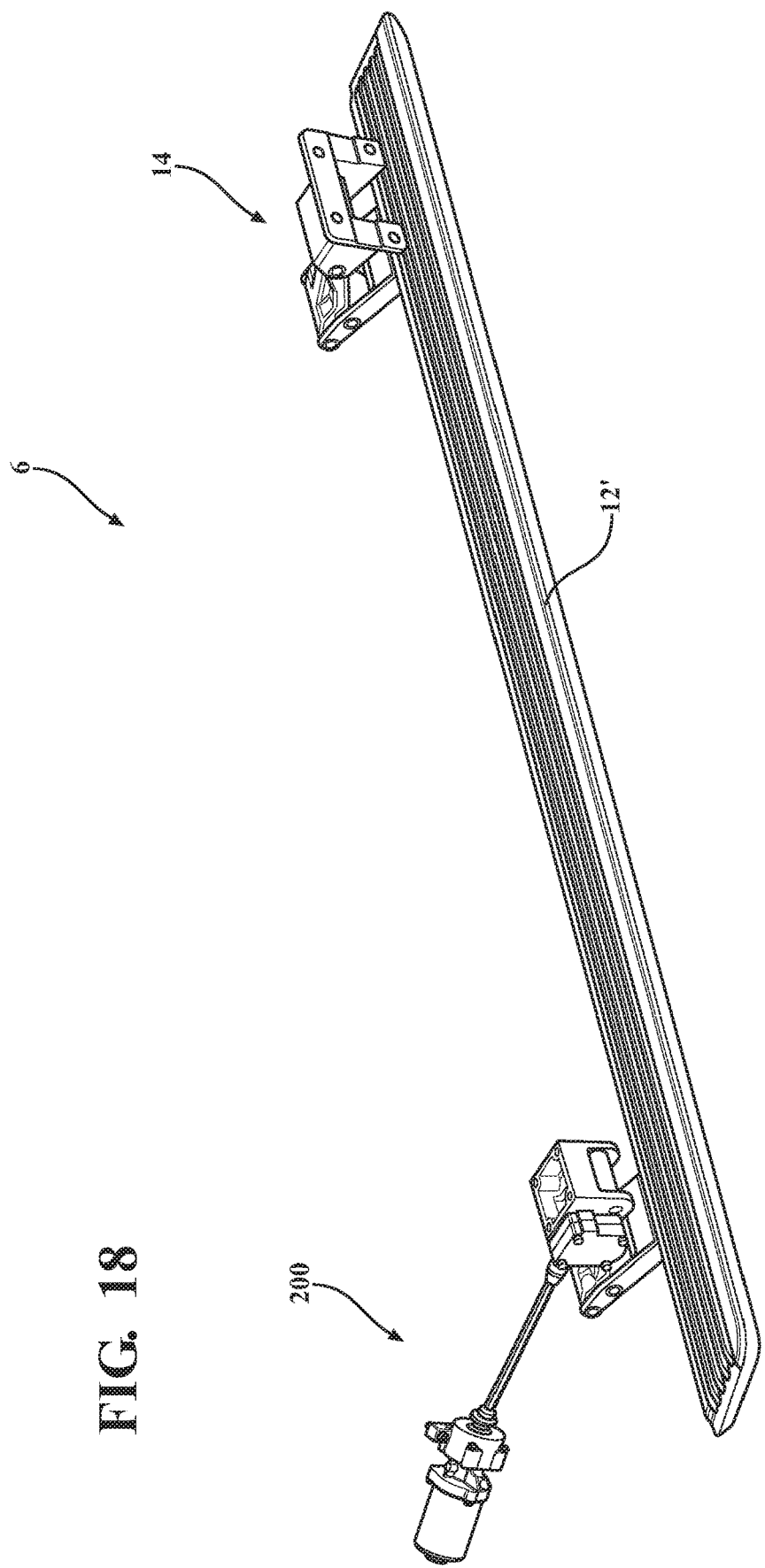
FIG. 18 is a perspective view of the embodiment of the invention shown in FIG. 3 employed on a side step for attachment to the rocker panel of a vehicle.
Figure 19:
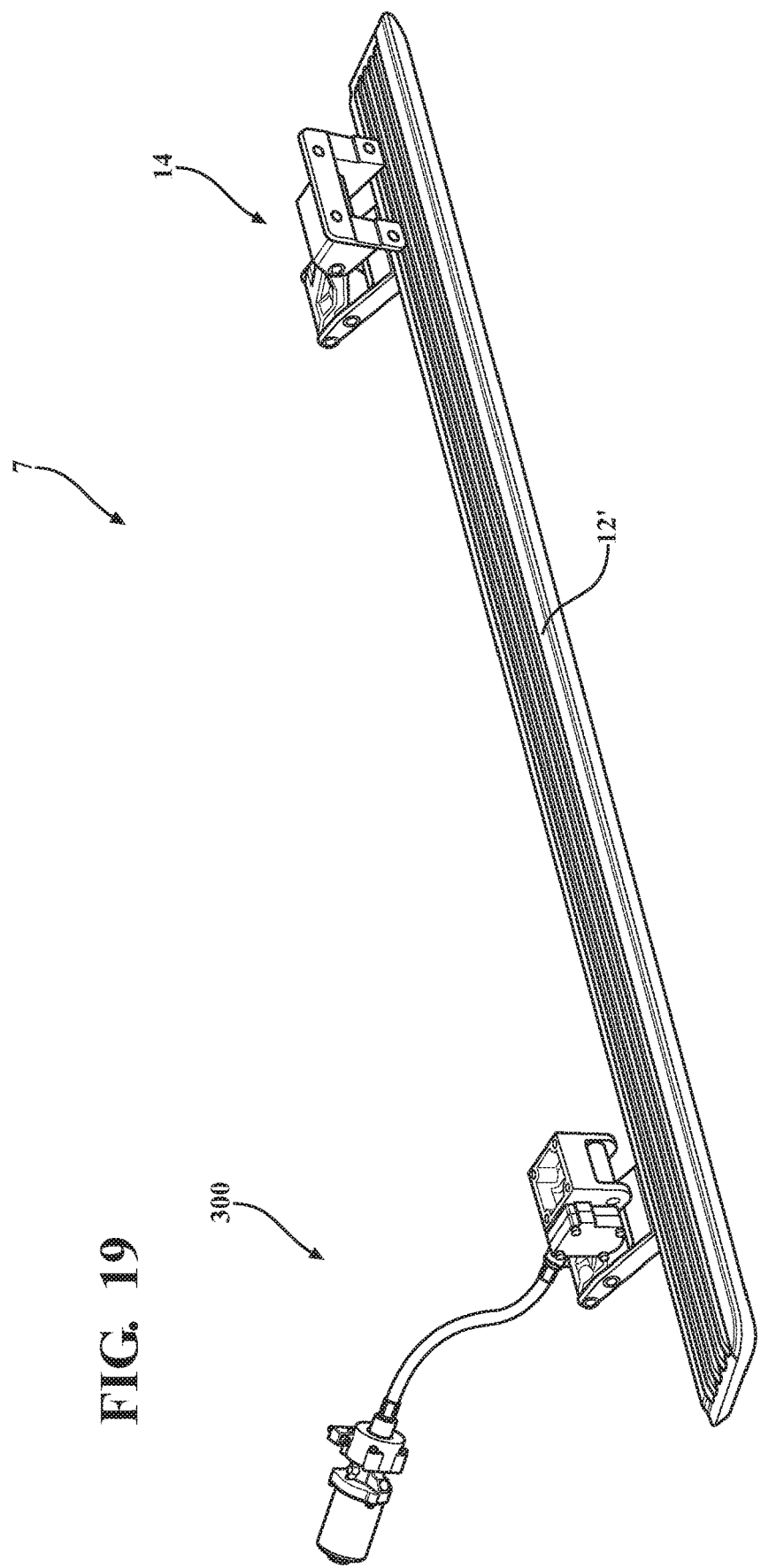
FIG. 19 is a perspective view of the embodiment of the invention shown in FIG. 6 employed on a side step for attachment to the rocker panel of a vehicle.
Figure 20:
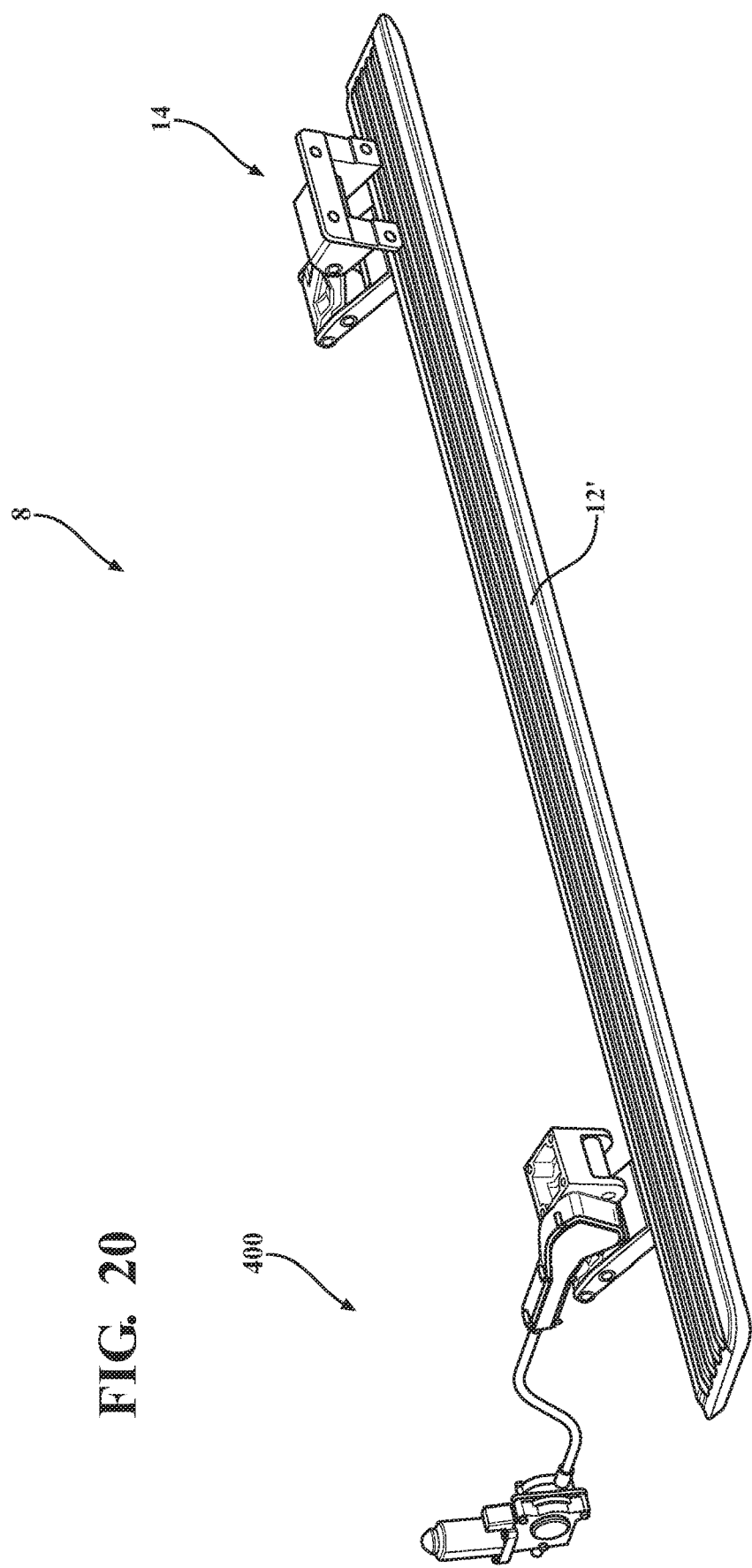
FIG. 20 is a perspective view of the embodiment of the invention shown in FIG. 10 employed on a side step for attachment to the rocker panel of a vehicle.

While the first female connector 214 is shown as an output of the motor 202 and the first male connector 212 is depicted as being on the end of the torque transfer shaft 204 it is within the scope of this invention for these connections to be reversed. Likewise, the second male connector 216 is shown as being connected to the worm gear 208 and the second female connector 218 is shown as being formed on the end of the torque transfer shaft 204, it is also within the scope of this invention for these connections to be reversed. It should be noted that other types of universal joint designs such a pin and block type or CV style could be employed to accomplish the drive with angled axis of the motor shaft, torque transfer shaft and worm axis. This remote drive can be used with other step types as shown in FIG. 18. The present embodiment of the invention allows the motor 202 to be linearly positioned at a spatial distance d' from the base 20 that is determined by the length of the torque transfer shaft 204.

Referring now to FIGS. 6-9 and 19 the foldable step assembly 3, 7 with linkage 300 will now be described. The drive mechanism 300 is also referred to as a "Remote motor flex shaft type". This includes a motor 302 connected to a flex shaft core 304 inside a cable casing 305 that connects to a transmission 306. More specifically the flex shaft core 304 is connected to a worm gear 308 within the transmission 306, the worm gear 308 has threads in mesh with teeth of a gear 310 rotatably connected to drive shaft 28 of linkage 11. The flex shaft core 304 is a helically wound core of wired with multiple layers in alternating helical directions over top of each other. The ends of the flex shaft fore 304 typically have square shaped ends 312, 314. The square shaped ends 312, 314 engaged with one of a first female connector 316 rotatably connected to the motor 302 or a second female connector 318 connected to or formed on the worm gear 308. The first female connector 316 and second female connector 318 are square shaped to form a mated fitting with one of the square ends 312, 314 of the flex shaft core 304.

The flex shaft core 304 is limited in torque transmission capability by their length and bend radius but still provide a remote location for the motor 302.

When the motor 302 rotates the first female connector 316 is driven by the motor 302, which then rotates the flex shaft core 304 through the connection of the first female connector 316 and square end 312. The rotation of the flex shaft core 304 rotates the square end 314, which rotates the second female connector 318 and the worm gear 308. The rotation of the worm gear 308 causes the gear 310 to rotate because the mesh engagement of the threads of the worm gear 308 with the teeth of the gear 310. The gear 310 is fixed to the drive shaft 28, thereby causing the drive shaft 28 to rotate with the gear 310. When the drive shaft 28 rotates the linkage 11 and the step 12, 12' will move between the retracted position or the extended position depending on the direction that the motor 302 rotates. The use of the flex shaft core 304 allows the motor 302 to be positioned at great distances and non-linear locations with respect to the base 20. The present embodiment of the invention allows the motor 302 to be linearly positioned at a spatial distance d" from the base 20 that is determined by the length of the flex shaft core 304.

Referring now to FIGS. 10-17 and 20 the foldable step assembly 4, 8 with linkage 400 will now be described. The drive mechanism 400 is also referred to as a "Remote motor push/pull cable type." The motor 402 is attached to a drive housing 403 which is connected to a cable casing 405 that connects between the drive housing 403 and a transmission 406 attached the base 20. The cable casing 405 connects to a casing connector 407 on the drive housing 403. Within the drive housing 403 there is a gear 408 with teeth 410 that engage that is in mesh engagement with a cable core 412 capable of sliding within the cable casing 405. The cable core 412 has a helically wound wire 414 wrapped around an inner core 416. This helically wound wire 414 has a helical pitch length equal to the circular tooth pitch of the teeth 410 of the gear 408.

The opposite end of the cable casing 405 from the drive housing 403 there is a casing connector 418 that connects to a casing lock 420 formed on the housing of the transmission 406. The cable core 412 terminates in the housing of the transmission 406 at a lug 422 fixed to an end of the cable core 412. The lug 422 is held in place by a trunnion 424 that is connected to a link 426 that is slidably positioned in a bore 429 of the housing of the transmission 406. The link 426 is pivotally connected to a drive link 430, which has a clamp 432, that locks onto and rotates the drive shaft 28 of the linkage 11.

During operation the motor 402 rotates the gear 408 in one of two different directions, thereby pushing or pulling the cable core 412 through the cable casing 405. When the cable core 412 is pulled through the cable casing 405 away from the transmission 406 the lug 422 pulls the trunnion 424 and the link moves in the bore 428 toward the casing lock 420. This causes the link 426 to rotate the drive link 430 and output shaft 28 counter clockwise, thereby moving the link 11 and step 12, 12' to the extended direction. When the motor 402 rotates the gear 408 in a second one of two different directions the cable core 412 is pushed through the cable casing 405. When the cable core 412 is pushed through the cable casing 405 toward the transmission the lug 422 pushes the trunnion 424 and the link 426 moves in the bore 428 away from the casing lock 420. This causes the link 426 to rotate the drive link 430 and the output shaft 28 clockwise, thereby moving the link 11 and the step 12, 12' to the retracted position.

Figure 13:
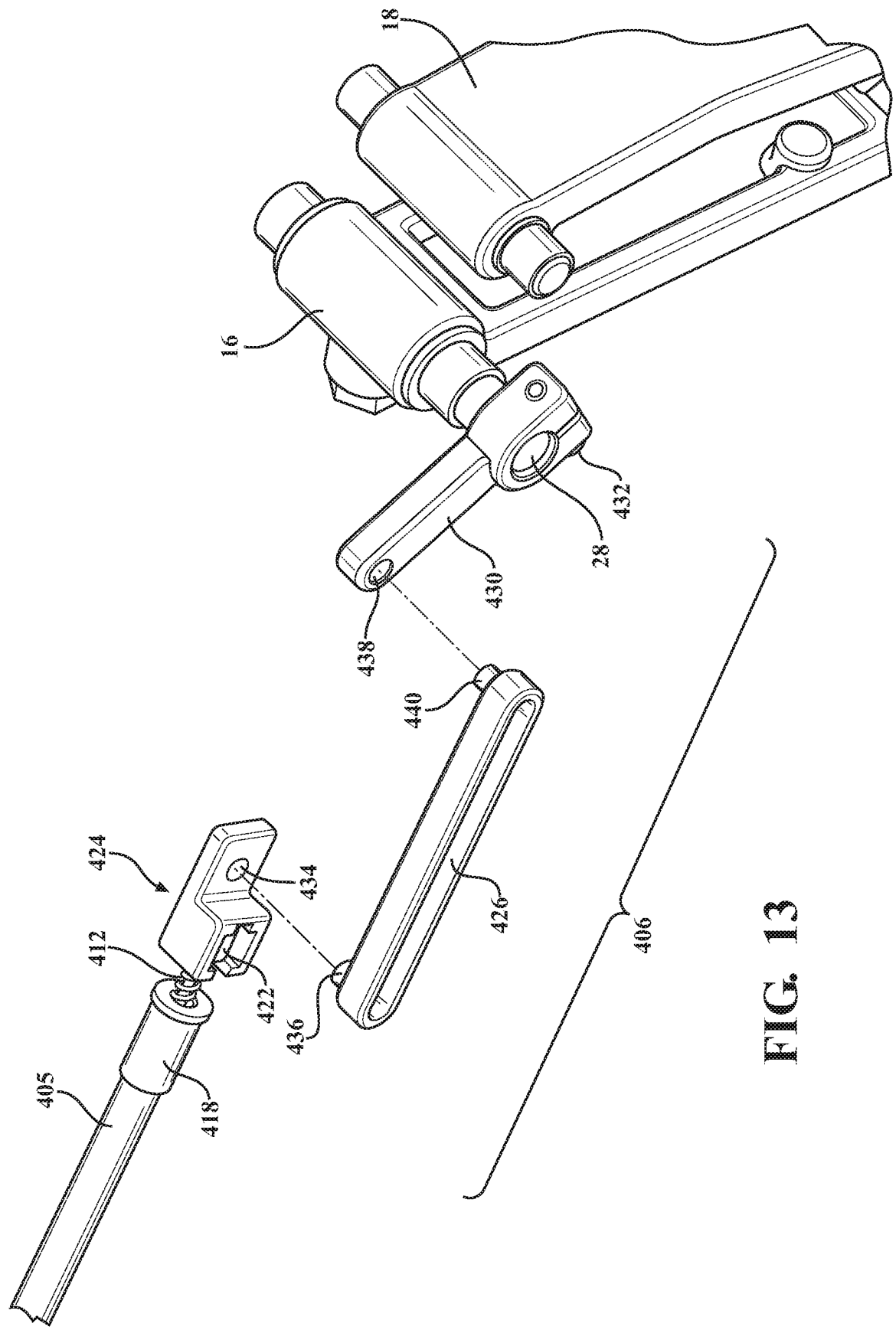
FIG. 13 is an exploded perspective view of the drive mechanism of FIG. 12.
Figure 14:
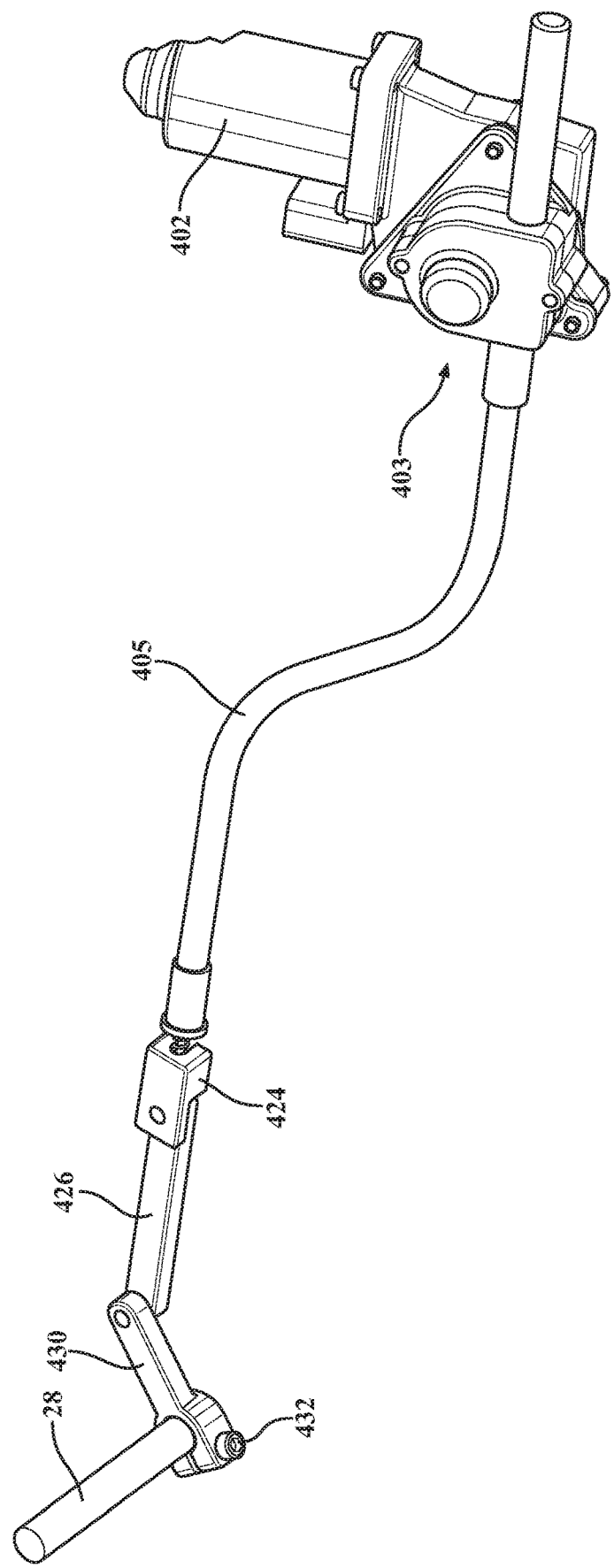
FIG. 14 is a perspective view of the drive mechanism of FIG. 13 assembled.
Figure 15:
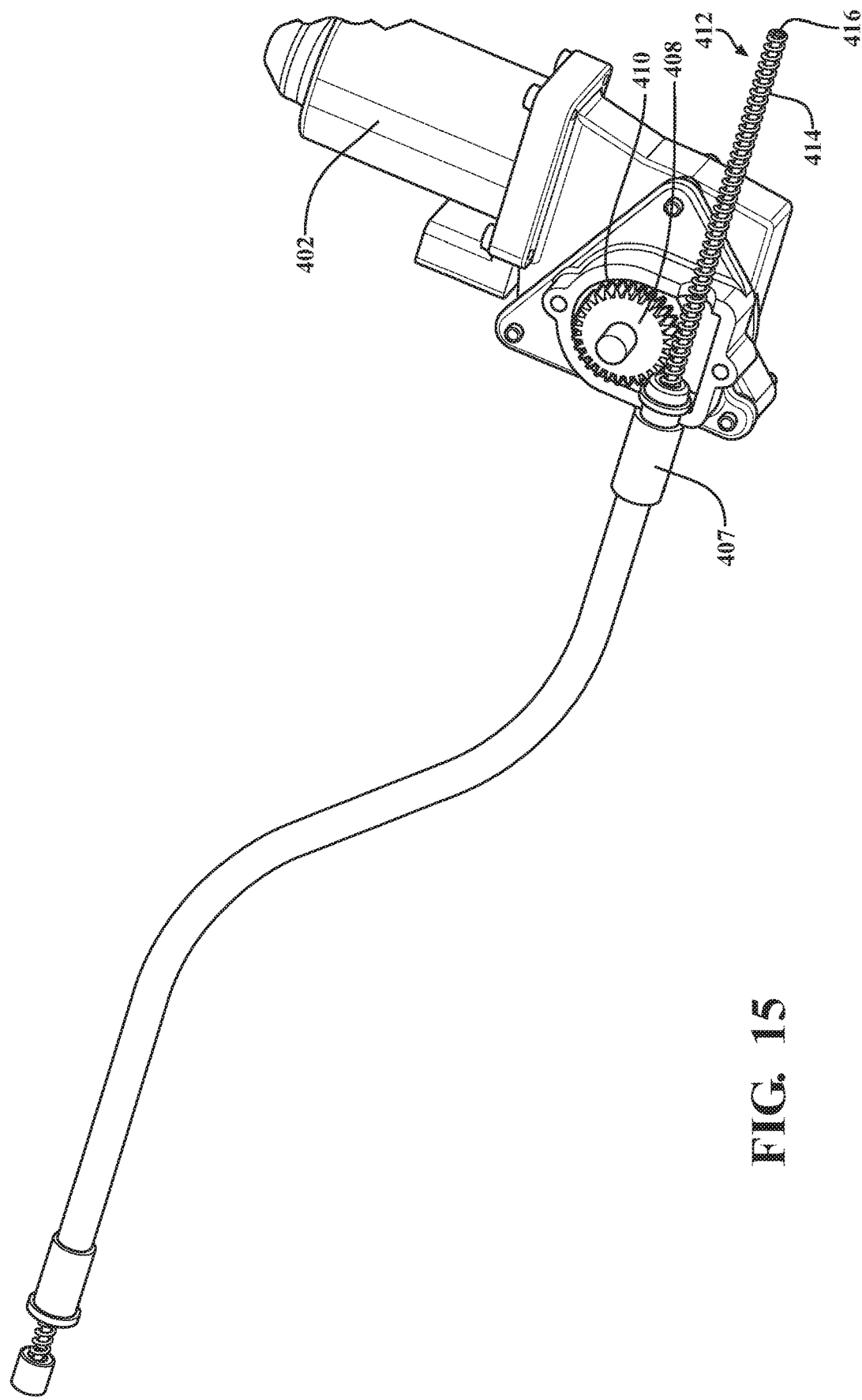
FIG. 15 is an alternate embodiment of a drive mechanism of the present invention.
Figure 16:
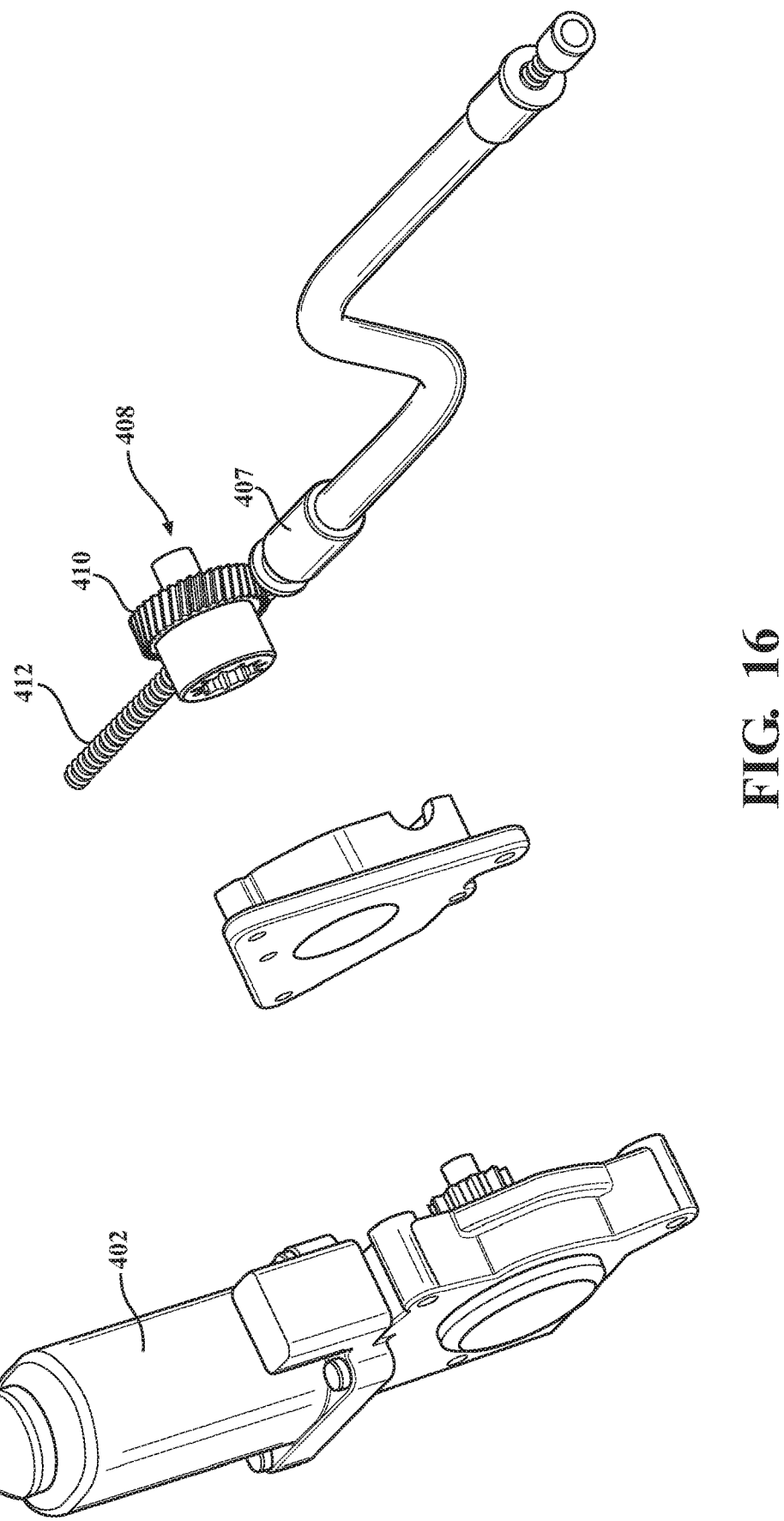
FIG. 16 is and exploded view of the drive mechanism of FIG. 15.
Figure 17:
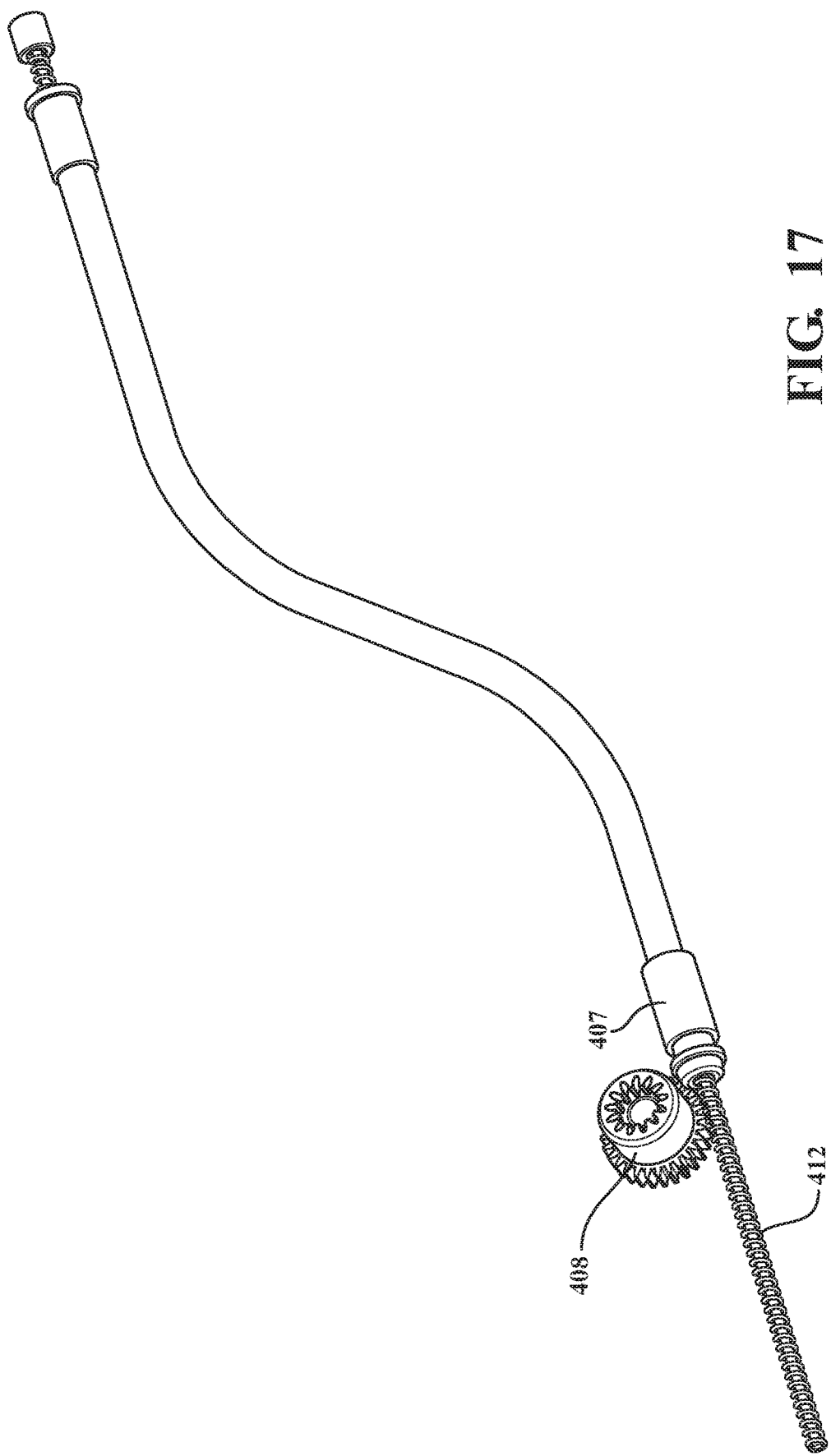
FIG. 17 is a perspective view of the drive cable arrangement of FIG. 16.

Referring now to FIG. 13 the details of the transmission 406 are shown in exploded view. The trunnion 424 has a tab with an aperture 434 that rotatably receives a post 436 of the link 426. The drive link 430 also has an aperture 438 that rotatably receives a post 440 of the link 426. The clamp 432 of the drive link 430 is connected to the drive shaft 28 of the drive arm 16, which rotates along with the follower arm 18 in response rotational force from the motor 402. The present embodiment of the invention allows the motor 402 to be linearly positioned at a spatial distance d''' from the base 20 that is determined by the length of the cable core 412.

All of the drive types described here provide a means to mechanically drive the retractable step from stow to deploy positions with the motor itself in a remote location more suitable packaged away from the drive linkage of the step assembly. The various methods offer a variation in cost and complexity and package ability to best suit the application.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A foldable step assembly for a vehicle comprising:
   a base connectable to a vehicle;
   a linkage connected to the base, the linkage is further connected to a step that is moved by the linkage between a deployed position to a stowed position;
   a motor having an output shaft positioned at a spatial distance from the base of the linkage;
   a drive mechanism connected between the motor and the linkage for transferring force across the spatial distance from the output shaft to the linkage for articulating the linkage and the step between an extended position and retracted position;
   a transmission connected to the base, the transmission includes a worm gear drivingly engaged to the linkage, wherein the drive mechanism includes a torque transfer shaft connected to the output shaft of the motor and the worm gear so that rotation of the torque transfer shaft rotates the worm gear;
   a first male connector on the torque transfer shaft that is received by a first female connector on the output shaft of the motor; and
   a second male connector connected to the worm gear that is received by a second female connector formed on the second end of the torque transfer shaft.

2. The foldable step assembly of claim 1 further comprises a drive shaft of the linkage connected to a gear located within the transmission, wherein the gear is in mesh engagement with the worm gear and rotation of the worm gear rotates the gear and drive shaft.

3. The foldable step assembly of claim 2 wherein the spatial distance is equal to the length of the drive shaft.

4. A foldable step assembly for a vehicle comprising:
   a base connectable to a vehicle;
   a linkage connected to the base, the linkage is further connected to a step that is moved by the linkage between a deployed position to a stowed position;
   a motor having an output shaft positioned at a spatial distance from the base of the linkage; and
   a drive mechanism connected between the motor and the linkage for transferring force across the spatial distance from the output shaft to the linkage for articulating the linkage and the step between an extended position and retracted position;

a transmission connected to the base, the transmission includes a worm gear drivingly engaged to the linkage, wherein the drive mechanism includes a cable casing with a flex shaft core slidable in the cable casing, wherein the cable casing connects to both the output shaft of the motor and the worm gear and rotation of the flex shaft core rotates the worm gear;

a first square end on a first end of the cable core and a second square end on a second end of the cable core;

a first female connector connected to the output shaft of the motor, wherein the first square end of the cable core is received by the first female connector, and a second female connector connected to the worm gear of the transmission, wherein the second square end of the cable core is received by the second female connector.

5. The foldable step assembly of claim 4 wherein the spatial distance is equal to the length of the cable core.

6. A foldable step assembly for a vehicle comprising:
a base connectable to a vehicle;
a linkage connected to the base, the linkage is further connected to a step that is moved by the linkage between a deployed position to a stowed position;
a motor having an output shaft positioned at a spatial distance from the base of the linkage;
a drive mechanism connected between the motor and the linkage for transferring force across the spatial distance from the output shaft to the linkage for articulating the linkage and the step between an extended position and retracted position;
a transmission connected to the base;
a drive housing connected to the motor and having a gear with teeth connected to and rotatably driven by the motor;
a cable casing connected between the transmission and the drive housing;
a cable core slidably positioned in the cable casing, wherein the cable core has features on the surface capable of meshing with the gear in the drive housing so that rotation of the gear in the drive housing moves slides the cable core in the cable casing, wherein one end of the cable core is located in the transmission and slides in the transmission in response to rotation of the gear in the drive housing, and
a drive link connected to the drive shaft of the linkage, the drive link is located in the transmission and is operatively connected to the end of the cable core so that when the cable core slides in the transmission the drive link rotates the drive shaft of the linkage.

7. The foldable step assembly of claim 6 wherein the cable core includes an inner core with a helical wire wound on the inner core to form the features on the cable core.

8. The foldable step assembly of claim 6 wherein the spatial distance is equal to the length of the cable casing.

9. The foldable step assembly of claim 6 further comprising:
a lug formed on the end of the cable core located in the transmission;
a trunnion connected to the lug;
a link connected to the trunnion and the drive link, wherein the lug, trunnion and link are slidable in a bore of the transmission and more the drive link to rotate the drive shaft.

10. The foldable step assembly of claim 6, further comprising a follower link connected to the step.

11. A foldable step assembly for a vehicle comprising:
a base connectable to a vehicle;
a linkage connected to the base, the linkage is further connected to a step that is moved by the linkage between a deployed position to a stowed position;
a motor having an output shaft positioned at a spatial distance from the base of the linkage;
a drive mechanism connected between the motor and the linkage for transferring force across the spatial distance from the output shaft to the linkage for articulating the linkage and the step between an extended position and retracted position,
a transmission connected to the base, the transmission includes a worm gear drivingly engaged to the linkage, wherein the drive mechanism includes a cable casing with a flex shaft core slidable in the cable casing, wherein the cable casing connects to both the output shaft of the motor and the worm gear and rotation of the flex shaft core rotates the worm gear, wherein the spatial distance is equal to the length of the cable casing;
a drive shaft of the linkage connected to a gear located within the transmission, wherein the gear is in mesh engagement with the worm gear and rotation of the worm gear rotates the gear and the drive shaft;
a first square end on a first end of the cable core and a second square end on a second end of the cable core;
a first female connector connected to the output shaft of the motor, wherein the first square end of the cable core is received by the first female connector; and
a second female connector connected to the worm gear of the transmission, wherein the second square end of the cable core is received by the second female connector.

12. A foldable step assembly for a vehicle comprising:
a base connectable to a vehicle;
a linkage connected to the base, the linkage is further connected to a step that is moved by the linkage between a deployed position to a stowed position;
a motor having an output shaft positioned at a spatial distance from the base of the linkage;
a drive mechanism connected between the motor and the linkage for transferring force across the spatial distance from the output shaft to the linkage for articulating the linkage and the step between an extended position and retracted position,
a transmission connected to the base, the transmission includes a worm gear drivingly engaged to the linkage, wherein the drive mechanism includes a cable casing with a flex shaft core slidable in the cable casing, wherein the cable casing connects to both the output shaft of the motor and the worm gear and rotation of the flex shaft core rotates the worm gear, wherein the spatial distance is equal to the length of the cable casing;
a drive shaft of the linkage connected to a gear located within the transmission, wherein the gear is in mesh engagement with the worm gear and rotation of the worm gear rotates the gear and the drive shaft;
a drive housing connected to the motor and having a gear with teeth connected to and rotatably driven by the motor;
wherein the cable casing connected between the transmission and the drive housing;
wherein the cable core is slidably positioned in the cable casing, wherein the cable core has features on a surface capable of meshing with the gear in the drive housing so that rotation of the gear in the drive housing moves slides the cable core in the cable casing, wherein one end of the cable core is located in the transmission and slides in the transmission in response to rotation of the gear in the drive housing, and a drive link connected to the drive shaft of the linkage, the drive link is located in the transmission and is operatively connected to the end of the cable core so that when the cable core slides in the transmission the drive link rotates the drive shaft of the linkage.

13. The foldable step assembly of claim 12 wherein the cable core includes an inner core with a helical wire wound on the inner core to form the features on the cable core.

14. The foldable step assembly of claim 12 further comprising:

a lug formed on the end of the cable core located in the transmission;

a trunnion connected to the lug;

a link connected to the trunnion and the drive link, wherein the lug, trunnion and link are slidable in a bore of the transmission and more the drive link to rotate the drive shaft.

15. The foldable step assembly of claim 12 further comprising a follower link connected to the step.

16. The foldable step assembly of claim 1, further comprising a follower link connected to the step.

17. The foldable step assembly of claim 4, further comprising a follower link connected to the step.

* * * * *

UNITED STATES PATENT AND TRADEMARK OFFICE
CERTIFICATE OF CORRECTION

| | |
|---|---|
| PATENT NO. | : 11,919,481 B2 |
| APPLICATION NO. | : 17/426396 |
| DATED | : March 5, 2024 |
| INVENTOR(S) | : Bradley E. Watson |

It is certified that error appears in the above-identified patent and that said Letters Patent is hereby corrected as shown below:

In the Claims

Column 6, Claim 1, Line 36 insert -- a -- before retracted position

Column 7, Claim 4, Line 8 "cable" should be -- flex shaft --

Column 7, Claim 4, Line 9 "cable" should be -- flex shaft --

Column 7, Claim 4, Line 11 "cable" should be -- flex shaft --

Column 7, Claim 4, Line 15 "cable" should be -- flex shaft --

Column 7, Claim 5, Line 17 "cable" should be -- flex shaft --

Column 7, Claim 6, Line 29 insert -- a -- before retracted position

Column 7, Claim 6, Line 39 remove "moves" after -- drive housing --

Column 7, Claim 9, Line 61 "more" should be -- move --

Column 8, Claim 11, Line 25 "cable" should be -- flex shaft --

Column 8, Claim 11, Line 26 "cable" should be -- flex shaft --

Column 8, Claim 11, Line 28 "cable" should be -- flex shaft --

Column 8, Claim 11, Line 32 "cable" should be -- flex shaft --

Signed and Sealed this
Nineteenth Day of August, 2025

Coke Morgan Stewart
*Acting Director of the United States Patent and Trademark Office*

CERTIFICATE OF CORRECTION (continued)
U.S. Pat. No. 11,919,481 B2

Column 8, Claim 12, Line 66 remove "moves" after -- drive housing --

Column 9, Claim 14, Line 18 "more" should be -- move --